(12) United States Patent
Orlowski et al.

(10) Patent No.: US 9,004,491 B2
(45) Date of Patent: Apr. 14, 2015

(54) SHAFT SEAL ASSEMBLY

(71) Applicant: Inpro/Seal LLC, Rock Island, IL (US)

(72) Inventors: David C. Orlowski, Punta Gorda, FL (US); Neil F. Hoehle, Solon, IA (US); Robert A. Tejano, Aledo, IL (US); Morgan Pullias, Rock Island, IL (US)

(73) Assignee: Inpro/Seal LLC, Rock Island, IL (US)

( * ) Notice: Subject to any disclaimer, the term of this patent is extended or adjusted under 35 U.S.C. 154(b) by 0 days.

(21) Appl. No.: 13/917,877

(22) Filed: Jun. 14, 2013

(65) Prior Publication Data

US 2013/0277917 A1 Oct. 24, 2013

Related U.S. Application Data

(60) Provisional application No. 61/661,936, filed on Jun. 20, 2012, provisional application No. 61/659,714, filed on Jun. 14, 2012.

(51) Int. Cl.
*F16J 15/34* (2006.01)
*F16J 15/00* (2006.01)
*F16J 15/18* (2006.01)
*F16J 15/40* (2006.01)
*F16J 15/447* (2006.01)

(52) U.S. Cl.
CPC .............. *F16J 15/002* (2013.01); *F16J 15/187* (2013.01); *F16J 15/40* (2013.01); *F16J 15/4472* (2013.01)

(58) Field of Classification Search
USPC ........... 277/353, 411–41, 500, 518, 411–414, 277/543
See application file for complete search history.

(56) References Cited

U.S. PATENT DOCUMENTS

| 3,240,502 A | 3/1966 | Snyder |
| 3,243,212 A | 3/1966 | Diethelm |
| 3,683,474 A | 8/1972 | Young |
| 4,305,592 A | 12/1981 | Peterson |
| 4,466,619 A | 8/1984 | Adams |
| 4,575,102 A | 3/1986 | Raj et al. |
| 4,606,712 A * | 8/1986 | Vondra ............................ 418/88 |

(Continued)

FOREIGN PATENT DOCUMENTS

| DE | 1054795 B1 | 4/1959 |
| EP | 1967774 A | 9/2008 |

(Continued)

OTHER PUBLICATIONS

International Search Report and Opinion, for related application PCT/US2013/045824, Sep. 5, 2013.

(Continued)

*Primary Examiner* — Vishal Patel
(74) *Attorney, Agent, or Firm* — Hamilton IP Law, PC; Jay R. Hamilton; Charles A. Damschen

(57) ABSTRACT

An illustrative embodiment of a multi-shaft seal assembly generally includes a first seal, a second seal, and a collar. In the illustrative embodiment the collar may be integrally formed with a portion of the first seal, and may serve to axially space the second seal from the first seal. The second seal may be formed with a cutaway therein to ensure proper clearance between the second seal and one of the shafts. Other embodiments of the multi-shaft seal assembly use a collar formed with the equipment housing or second seal. Still other embodiments include additional seals for additional shafts.

12 Claims, 23 Drawing Sheets

(56) References Cited

U.S. PATENT DOCUMENTS

| | | |
|---|---|---|
| 4,858,962 A | 8/1989 | Boelling et al. |
| 4,948,151 A | 8/1990 | Janzen et al. |
| 4,990,069 A * | 2/1991 | Guittet et al. ............ 418/9 |
| 5,480,161 A | 1/1996 | Borowski |
| 5,636,849 A | 6/1997 | Jonsson et al. |
| 5,799,905 A | 9/1998 | Rokita |
| 5,799,950 A | 9/1998 | Allen et al. |
| 6,004,037 A | 12/1999 | Harris et al. |
| 6,145,843 A | 11/2000 | Hwang |
| 6,168,163 B1 | 1/2001 | Thorson et al. |
| 6,390,477 B1 | 5/2002 | Drago et al. |
| 6,585,416 B1 | 7/2003 | Rimmer |
| 6,592,127 B1 | 7/2003 | Flower et al. |
| 6,648,336 B1 | 11/2003 | Kostrzewsky et al. |
| 6,955,473 B2 | 10/2005 | Reddehase et al. |
| 7,055,825 B2 | 6/2006 | Watanabe et al. |
| 7,090,403 B2 | 8/2006 | Orlowski et al. |
| 7,396,017 B2 | 7/2008 | Orlowski et al. |
| 2003/0235354 A1 | 12/2003 | Orlowski et al. |
| 2007/0013142 A1 | 1/2007 | Chitren |
| 2007/0241514 A1 | 10/2007 | Orlowski et al. |
| 2010/0253005 A1 * | 10/2010 | Liarakos et al. ............ 277/353 |

FOREIGN PATENT DOCUMENTS

| | | |
|---|---|---|
| JP | 10299905 A | 11/1998 |
| JP | 2005016557 A | 1/2005 |
| WO | 9805890 A | 2/1998 |
| WO | 2007008270 A | 1/2007 |

OTHER PUBLICATIONS

International Search Report and Opinion, for related application PCT/US2013/076752, Apr. 15, 2014.

* cited by examiner

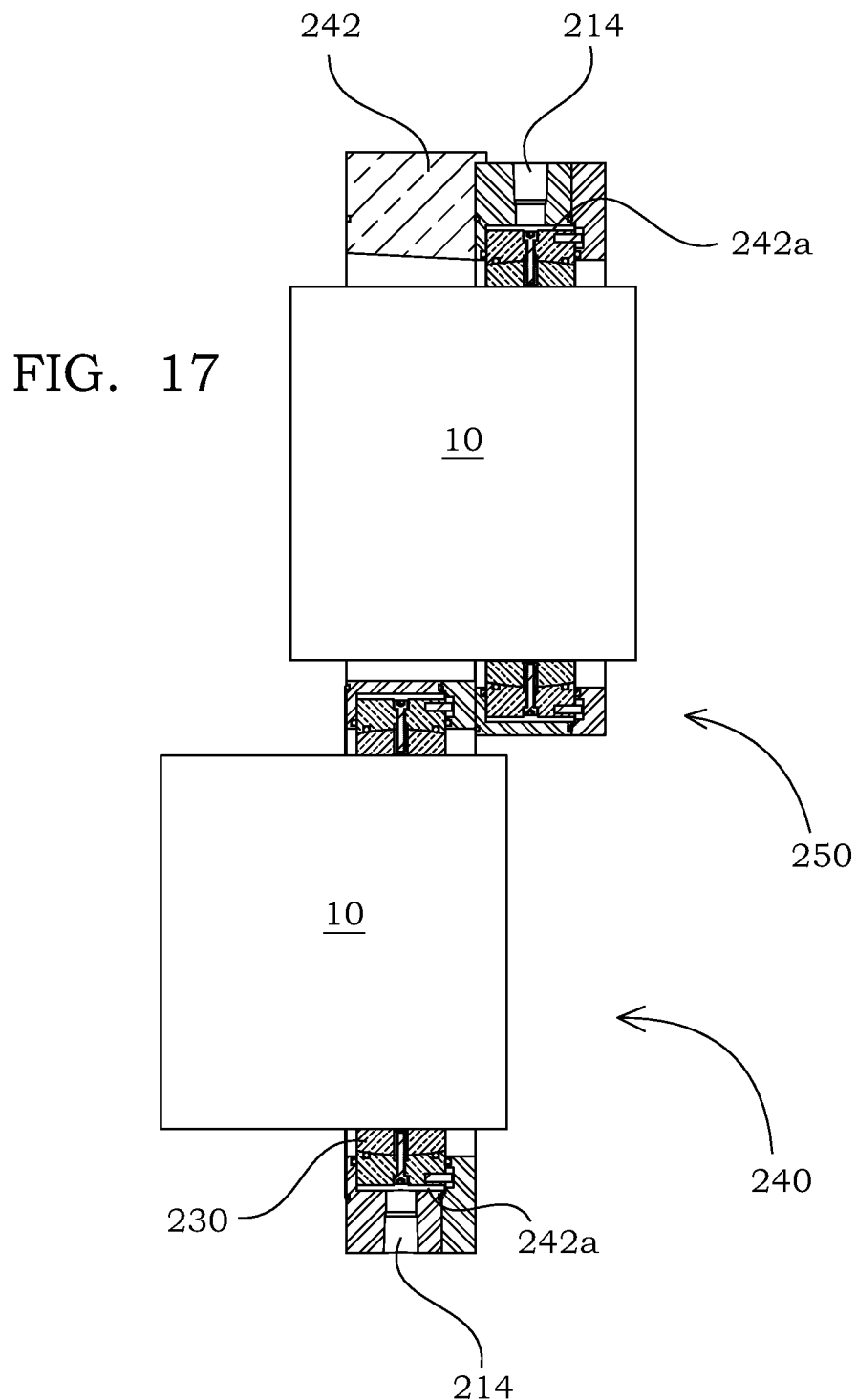

SHAFT SEAL ASSEMBLY

CROSS REFERENCE TO RELATED APPLICATIONS

Applicant states that this utility patent application claims priority from provisional Pat. App. Nos. 61/659,714 filed on 06/14/2012 and 61/661,936 filed on 06/20/2012, both of which are incorporated by reference herein in their entireties.

FIELD OF THE INVENTION

The present invention relates to a shaft seal assembly with multiple embodiments. In certain embodiments, the shaft seal assembly may be used as a product seal between a product vessel and a shaft therein.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

BACKGROUND OF THE INVENTION

For years there have been a multitude of attempts and ideas for providing a satisfactory seal when a rotatable shaft is angularly misaligned resulting in run out of the shaft. Typically the solutions presented have failed to provide an adequate seal while allowing for an acceptable amount of shaft misalignment during operation. The problem is especially acute in product seals where the potential for shaft to bore misalignment may be maximized. A typical solution in the prior art is to increase the operating clearance between the rotating shaft and sealing members to create a "loose" clearance or operating condition. "Loose" running for adjustment or response to operational conditions, especially misalignment of the shaft with respect to the stator or stationary member, however, typically reduces or lowers the efficiency and efficacy of sealing members.

Labyrinth seals, for example, have been in common use for many years for application to sealing rotatable shafts. A few of the advantages of labyrinth seals over contact seals are increased wear resistance, extended operating life and reduced power consumption during use. Labyrinth seals, however, also depend on a close and defined clearance with the rotatable shaft for proper function. Shaft misalignment is also a problem with "contact" seals because the contact between the seal and misaligned shaft typically results in greater wear. Abrasiveness of the product also affects the wear pattern and the useful life of the contact seals.

Prior attempts to use fluid pressure (either vapor or liquid) to seal both liquid and solid materials in combination with sealing members such as labyrinth seals or contact seals have not been entirely satisfactory because of the "tight" or low clearance necessary to create the required pressure differential between the seal and the product on the other side of the seal (i.e., the tighter the seal, the lower the volume of fluid required to maintain the seal against the external pressure of material.) Another weakness in the prior art is that many product seals expose the movable intermeshed sealing faces or surfaces of the product seal to the product resulting in aggressive wear and poor reliability. Furthermore, for certain applications, the product seal may need to be removed entirely from the shaft seal assembly for cleaning, because of product exposure to the sealing faces or surfaces.

The prior art then has failed to provide a solution that allows both a "tight" running clearance between the seal members and the stationary member for efficacious sealing and a "loose" running clearance for adjustment or response to operational conditions especially misalignment of the rotatable shaft with respect to the stator or stationary member.

SUMMARY OF THE INVENTION

The present art offers improved shaft sealing and product seal performance over the prior art. The shaft seal assembly solution disclosed and claimed herein allows both tight or low running clearance between seal members and the stationary member and a loose running clearance for adjustment or response to operational conditions especially misalignment of a rotatable shaft with respect to the stator or stationary member.

As disclosed herein, the present art describes and provides for improved function by allowing a labyrinth seal to adjust to radial, axial and angular movements of the shaft while maintaining a desired shaft-to-labyrinth clearance. The present art also permits equalization of pressure across the labyrinth pattern by permitting venting and thus improved function over currently available designs. Additionally, sealing fluid (air, steam, gas or liquid) pressure may be applied through the vent or port locations to establish an internal seal pressure greater than inboard or outboard pressure (over-pressurization). This enables the labyrinth to seal pressure differentials that may exist between the inboard and outboard sides of the seal. Pressurization of the internal portion of the shaft seal assembly effectively isolates the moving or engaging faces of the shaft seal assembly from contact with product by design and in combination with a pressurized fluid barrier.

It is therefore an object of the present invention to provide a shaft seal assembly for engagement with a housing which maintains its sealing integrity with a shaft upon application of axial, angular or radial force upon said shaft.

It is another object of the present invention to provide a shaft seal assembly that may be mounted to a vessel wall for engagement with a shaft which maintains its sealing integrity with a shaft during or in response to axial, angular or radial force movement of said shaft.

Other objects and features of the invention will become apparent from the following detailed description when read with reference to the accompanying drawings.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 17 is an axial, cross-sectional view of one of the seals shown in the embodiment in FIG. 15.

DETAILED DESCRIPTION—ELEMENT LISTING (FIGS. 1-8)

Figure 2:
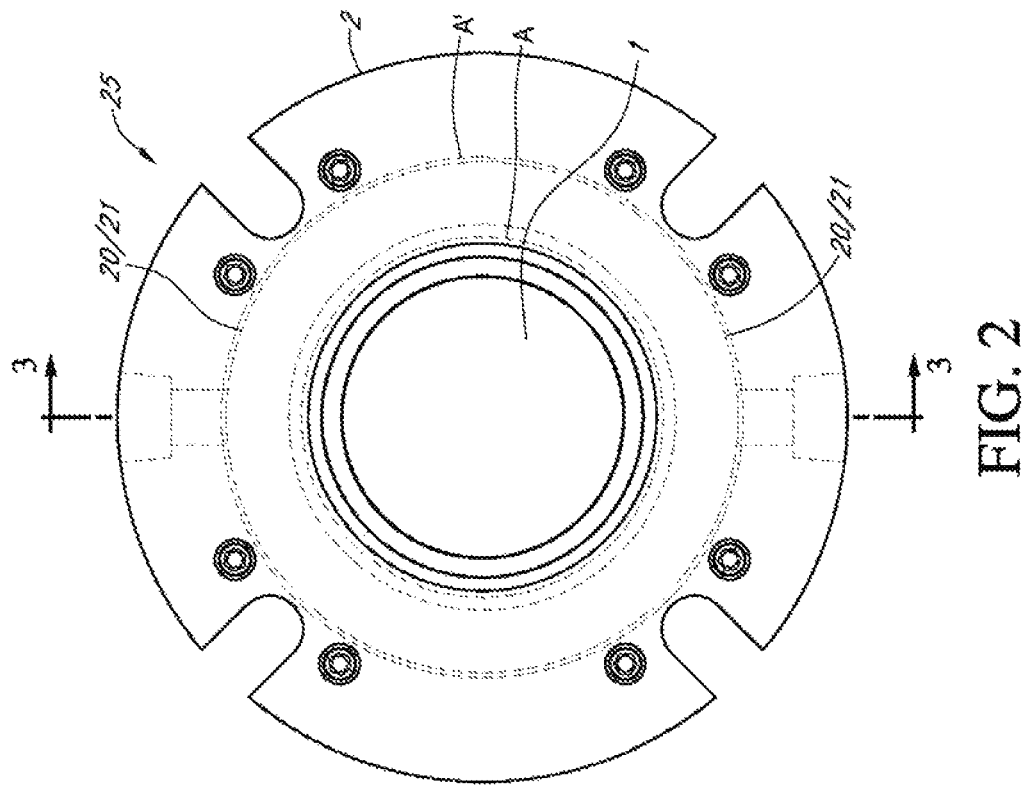
FIG. 2 is an exterior end view of the shaft seal assembly with the shaft element aligned.

| Description | Element No. |
|---|---|
| Shaft | 1 |
| Fixed stator | 2 |
| Fixed stator (part-line) | 2a |
| Labyrinth seal | 3 |
| Radiused face | 3a |
| Floating stator | 4 |
| Fluid return pathway | 5 |
| Shaft seal clearance | 6 |
| First o-ring | 7 |
| Anti-rotation pin | 8 |
| Vent | 9 |
| Anti-rotation groove (floating stator) | 10 |
| Spherical interface | 11 |
| Anti-rotation pin | 12 |
| Second o-ring | 13 |
| Labyrinth seal pattern grooves | 14 |
| First o-ring channel | 15 |
| Cavity for anti-rotation device (fixed stator) | 16 |
| Axial face of labyrinth seal | 17 |
| Axial face of floating stator | 18 |
| Second o-ring channel | 19 |
| First clearance between floating stator/fixed stator | 20 |
| Second clearance between floating stator/fixed stator | 21 |
| Throttle groove | 22 |
| Labyrinth pattern annular groove | 23 |
| Sleeve | 24 |
| Shaft seal assembly | 25 |
| Throttle (alignment skate) | 26 |
| Floating stator annular groove | 27 |
| Labyrinth seal passage | 28 |
| Floating stator passage | 29 |
| Housing | 30 |
| Angle of misalignment | 31 |
| Bearings and bearing cavity | 32 |
| Mounting bolts | 33 |
| Vessel wall | 34 |

Detailed Description

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 4:
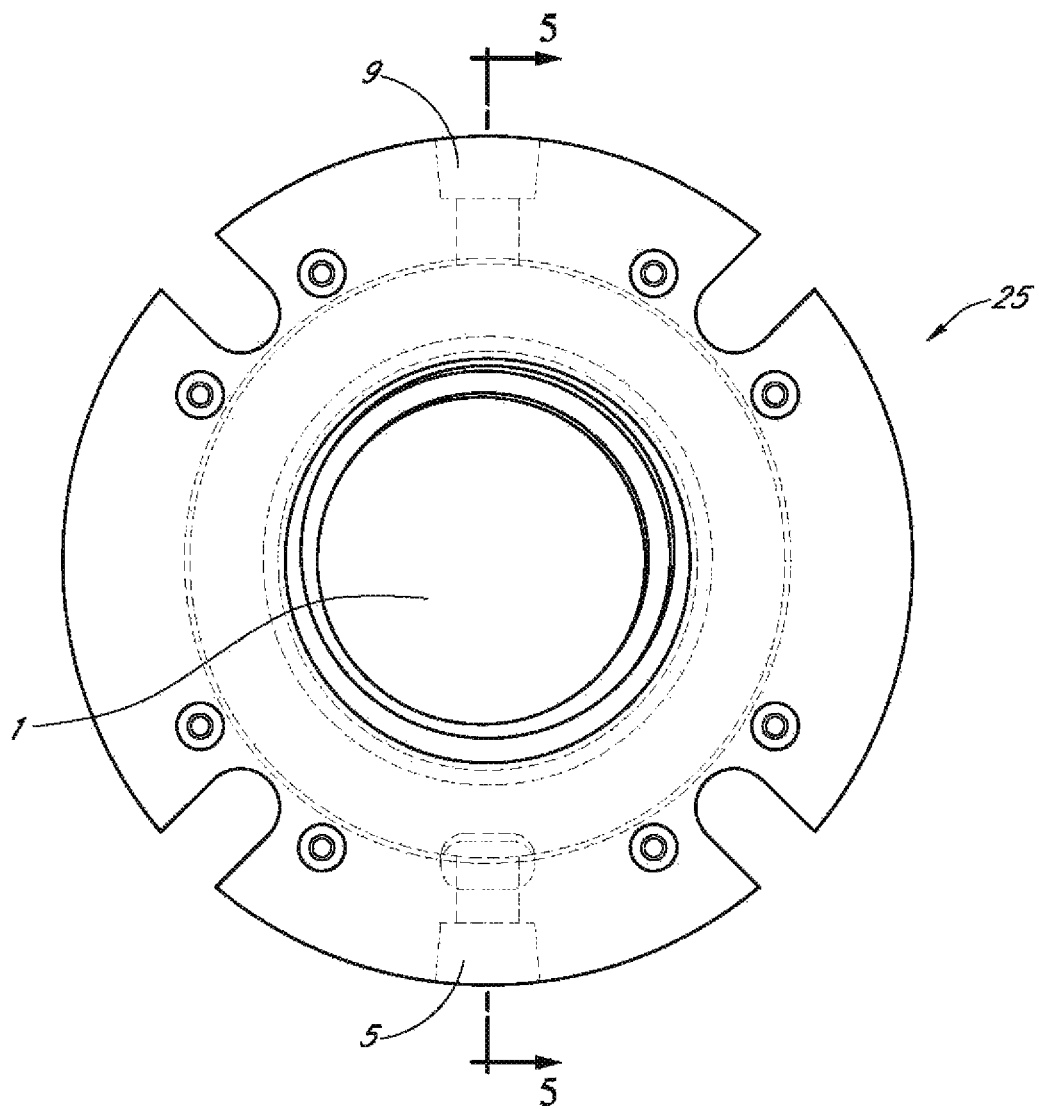
FIG. 4 is an exterior end view with the shaft misaligned.
Figure 5:
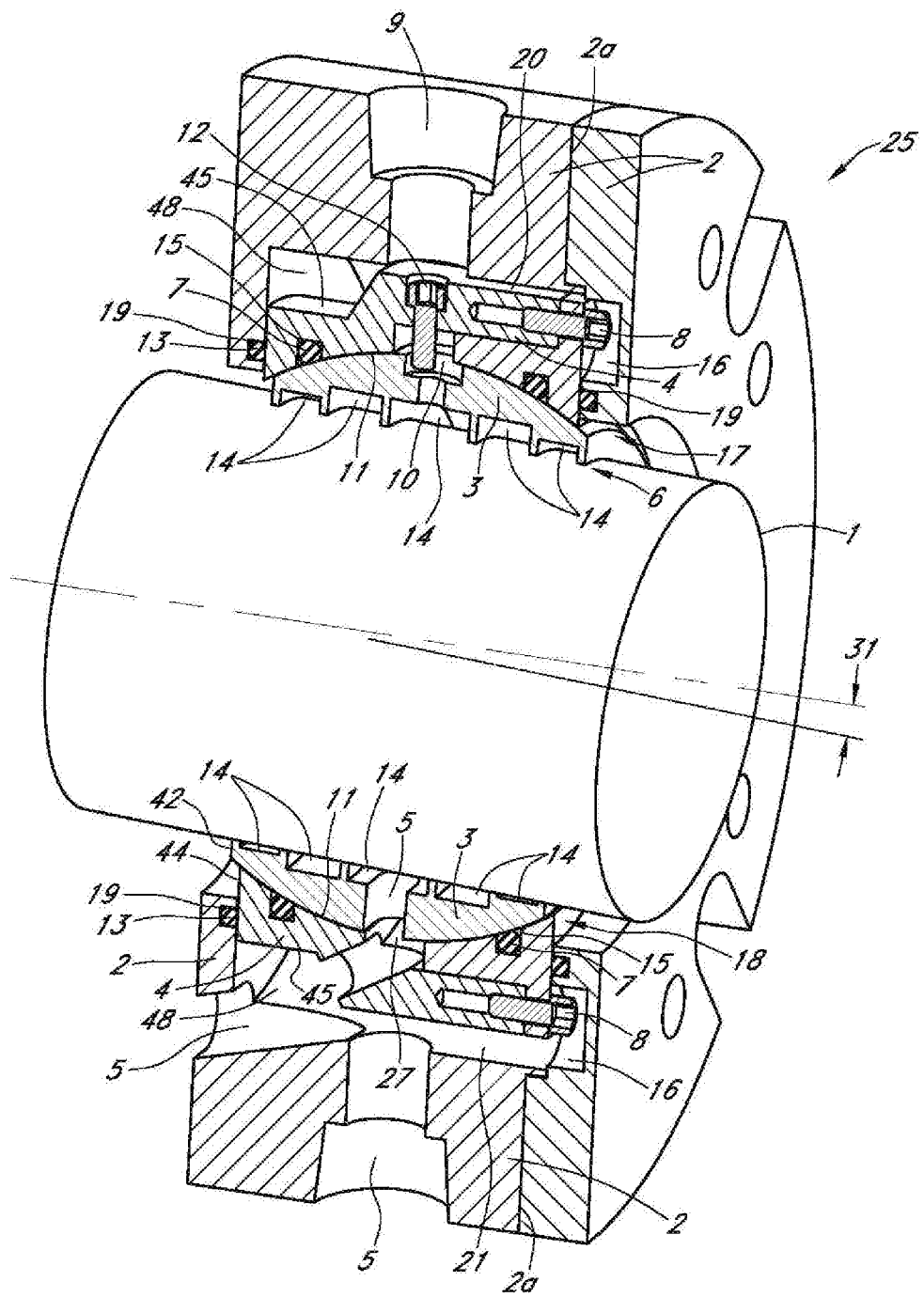
FIG. 5 is a sectional view of the first embodiment as shown in FIG. 3 with both angular and radial misalignment of the shaft applied.
Figure 6:
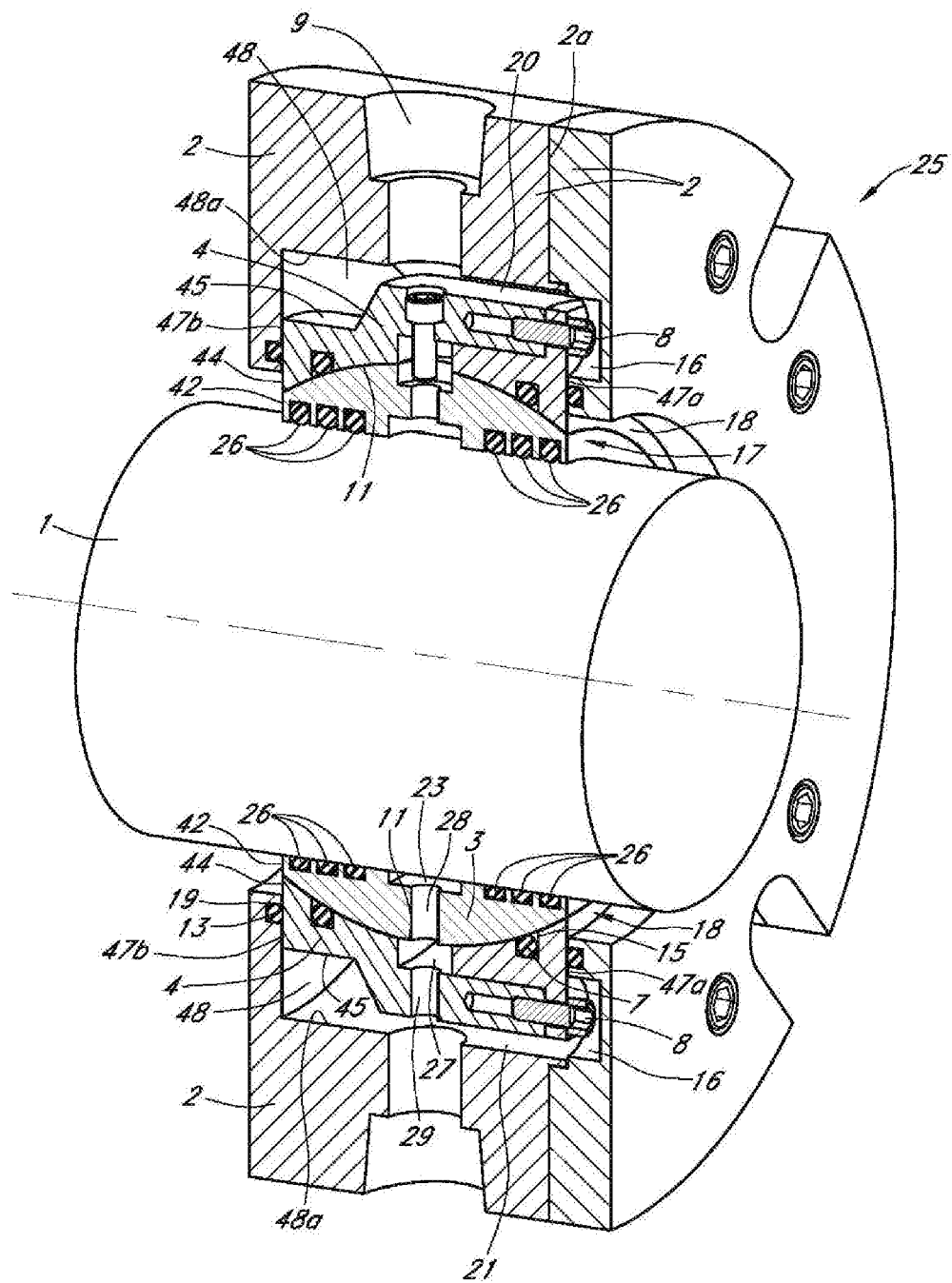
FIG. 6 is a sectional view of a second embodiment of the shaft seal assembly as shown in FIG. 2.
Figure 7:
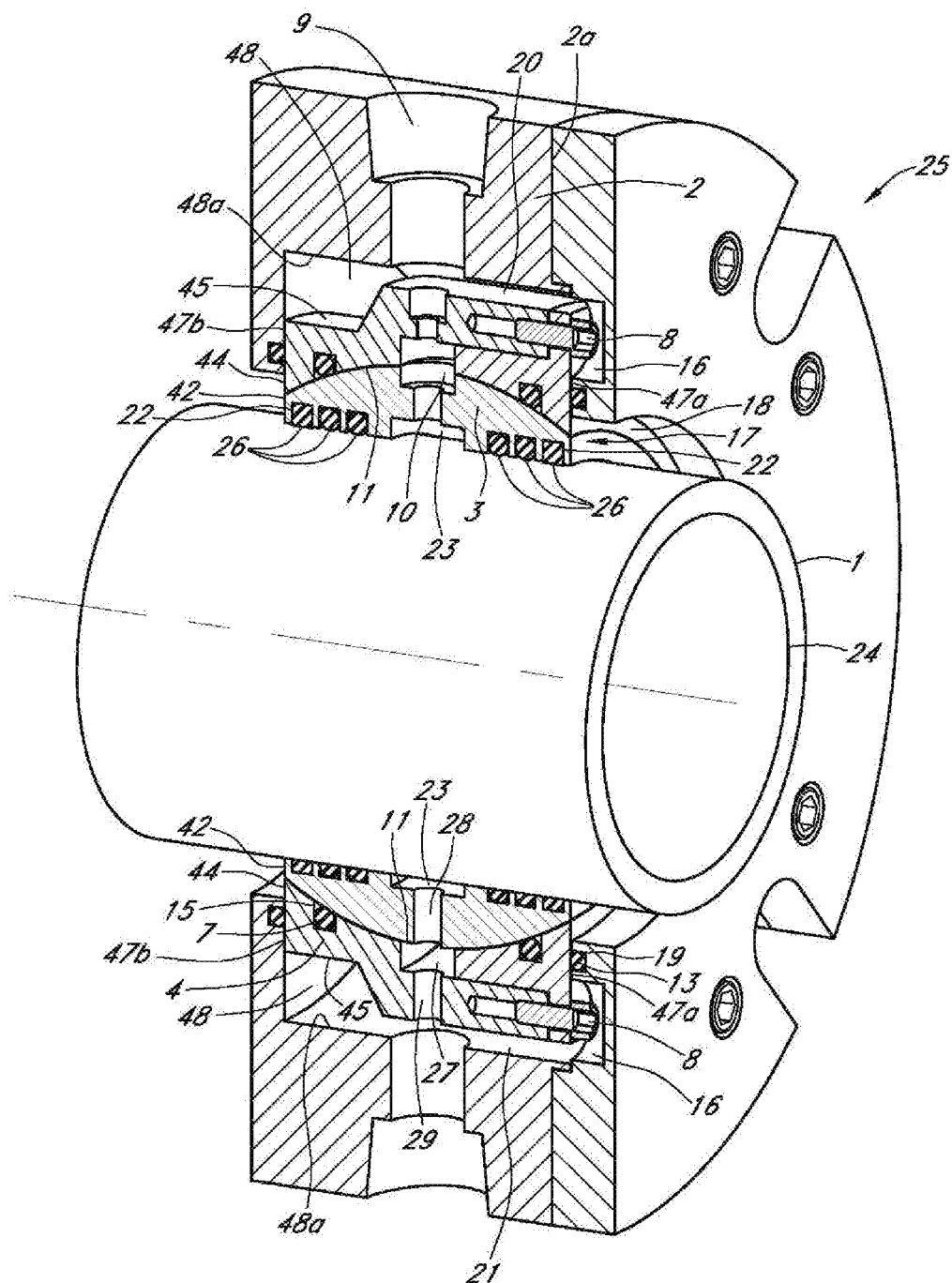
FIG. 7 is a sectional view of a third embodiment as shown in FIG. 2.

FIGS. 1-5 provide a view of a first embodiment of the shaft seal assembly 25 that allows for sealing various lubricating solutions within bearing housing 30. FIGS. 6 and 7 provide alternative embodiments of the shaft seal assembly 25 wherein sealing fluids are used. Applicant herein defines sealing fluids to include both liquids and vapors. Applicant considers air, nitrogen, water and steam as well as any other fluid which may work with the proposed shaft seal assembly to provide a pressurized fluid barrier for any and all embodiments disclosed herein to be within the purview of the present disclosure. The gas or fluid chosen is based on process suitability with the product to be sealed.

Figure 1:
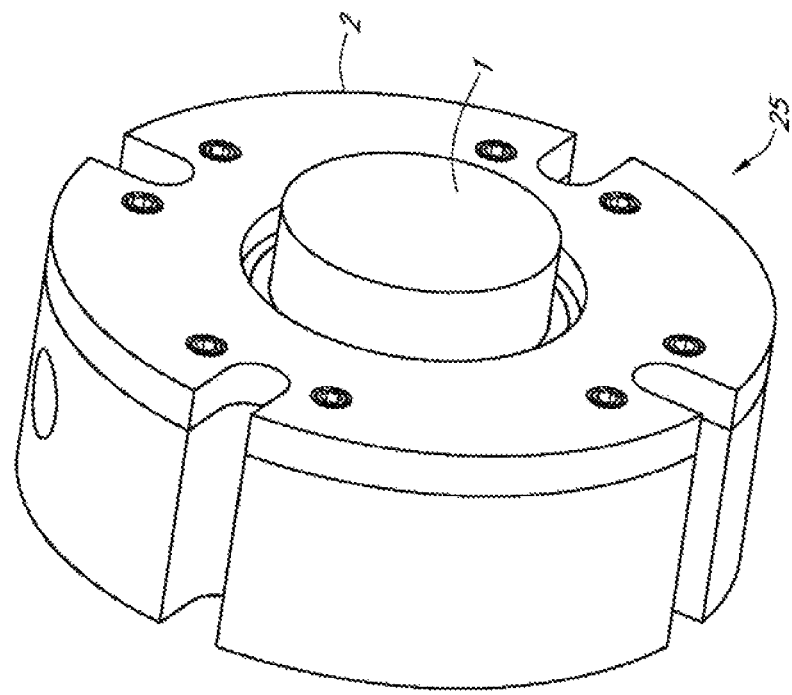
FIG. 1 is a perspective exterior view of the shaft seal assembly.

FIG. 1 is a perspective exterior view of the shaft seal assembly 25 arranged and engaged with a shaft 1 inserted through the fixed stator 2 of shaft seal assembly 25. FIG. 2 is an exterior end view of the shaft seal assembly with shaft 1 aligned within the shaft seal assembly 25.

Figure 3:
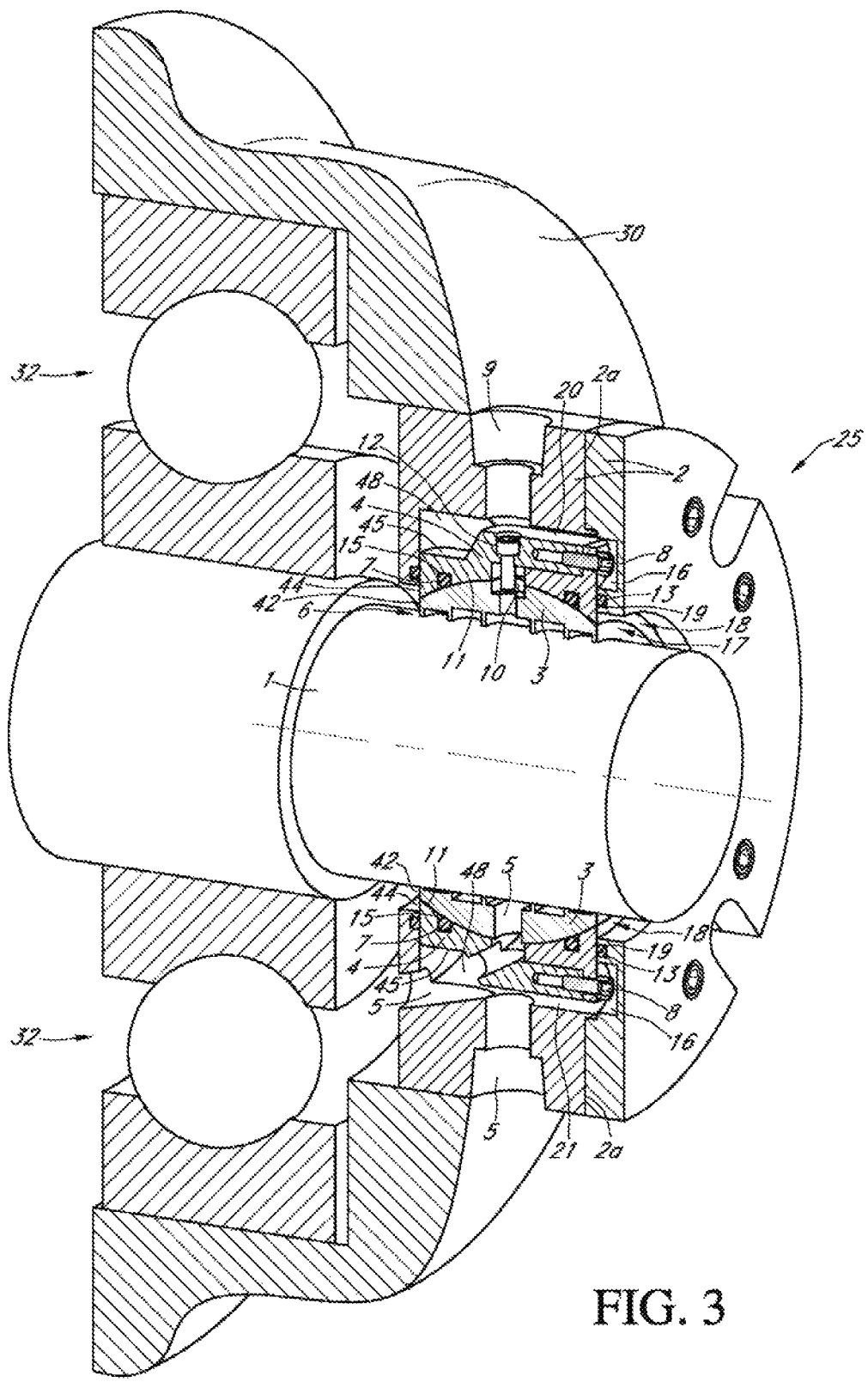
FIG. 3 is a sectional view of a first embodiment of the shaft seal assembly, as shown in FIG. 2 and mounted to a housing.

FIG. 3 is a sectional view of a first embodiment of the shaft seal assembly 25 shown in FIG. 2 illustrating the shaft seal assembly 25 as a labyrinth seal for retaining lubrication solution within the bearing cavity 32 of housing 30. The shaft 1 shown in FIG. 3 is the type which may experience radial, angular or axial movement relative to the fixed stator element or portion of the fixed stator 2 during rotation. The fixed stator portion of the shaft seal assembly 25 may be flange-mounted or press-fit or attached by other means to a housing 30. The invention will also function with a rotating housing and stationary shaft. (Not shown) As required by the particular application, the shaft 1 is allowed to move freely in the axial direction in relation to the shaft seal assembly 25.

A labyrinth seal 3 having an interior surface is engaged with shaft 1. A defined clearance 6 exists between the interior surface of said labyrinth seal 3 and the shaft 1. Opposite the interior surface of said labyrinth seal 3 is the radiused surface 3a of said labyrinth seal 3. The radiused surface 3a of the labyrinth seal 3 and the interior of the floating stator 4 forms a spherical interface 11. O-ring channels 15 and o-rings 7 are disposed to cooperate with said radiused surface 3a of said labyrinth seal 3 to seal (or trap) fluid migration through, between and along engaged labyrinth seal 3 and floating stator 4 while maintaining spherical interface 11 which allows limited relative rotational movement (articulation) between labyrinth seal 3 and floating stator 4. O-ring channels 15, as shown, are machined into the floating stator 4 and positioned at the spherical interface 11 with labyrinth seal 3. O-ring channels 15 are annular and continuous in relation to labyrinth seal 3. The o-ring channel 15 and o-ring 7 may also be placed in the labyrinth seal 3 adjacent the spherical interface 11. O-rings 7 should be made of materials that are compatible with both the product to be sealed and the preferred sealing fluid chosen. O-ring channels 15 and o-rings 7 are one possible combination of sealing means that may be used within the shaft seal assembly 25 as recited in the claims. Strategically placed anti-rotation pin(s) 12 inserted into anti-rotation grooves 10 limit relative rotational movement between labyrinth seal 3 and floating stator 4. A plurality of anti-rotation grooves 10 and pins 12 may be placed around the radius of the shaft 1. If the shaft seal assembly 25 is used in combination with a sealing fluid, strategic anti-rotation pins 12 may be removed allowing corresponding anti-rotation grooves 10 to serve as a fluid passage through vent 9 and lubricant return 5. (See FIG. 7) Additionally, the relationship of the diameters of anti-rotation pins 12 and anti-rotation grooves 10 may be selected to allow more or less angular misalignment of the shaft 1. A small diameter anti-rotation pin 12 used with a large diameter anti-rotation groove 10 would allow for greater relative movement of the labyrinth seal 3 in relation to the floating stator 4 in response to angular misalignment of shaft 1. Labyrinth seal 3 is one possible embodiment of a sealing means that may be used adjacent to the shaft 1 within the shaft seal assembly 25 as recited in the claims.

A continuous annular channel is formed within fixed stator 2 and defined by clearance 20 and 21 as allowed between the exterior of said floating stator 4 and said interior of said fixed stator 2 of shaft seal assembly 25. The annular channel of fixed stator 2 is highlighted as A-A' in FIG. 2. The annular channel of the fixed stator has interior surfaces which are substantially perpendicular to said shaft 1. The exterior surfaces of the floating stator 4, which is substantially encompassed within the annular channel of the fixed stator 2, cooperatively engage with the first and second interior perpendicular faces of the fixed stator 2. An inner annular interface is formed by the first (shaft seal assembly inboard side) perpendicular annular channel surface of the fixed stator 2 engaging with the first (inboard side) perpendicular face of the floating stator 4. An outer annular interface is formed by the second (shaft seal assembly outboard side) perpendicular annular interior channel surface of the fixed stator 2 engaging with the second (outboard side) perpendicular face of the floating stator 4. O-ring channels 19 and o-rings 13 disposed therein cooperate with the surfaces of floating stator 4 which are in perpendicular to relation to shaft 1 to sealing (or trap) fluid migration between and along engaged floating stator 4 while allowing limited relative rotational movement between floating stator 4 and fixed stator 2. Floating stator 4 and fixed stator 2 are one possible embodiment of cooperatively engaged sealing means that may be used in combination with labyrinth seal 3 within the shaft seal assembly 25 as recited in the claims.

O-ring channels 19 are annular and continuous in relation to shaft 1. The o-ring channels 19 and o-rings 13 may be placed in the body of the floating stator 4 instead of the fixed stator 2 (not shown) but must be placed in similar proximal relation. O-rings 13 should be made of materials that are compatible with both the product to be sealed and the preferred sealing fluid chosen. O-ring channels 19 and o-rings 13 are one possible combination of sealing means that may be used within the shaft seal assembly 25 as recited in the claims.

Strategically placed anti-rotation pin(s) 8 inserted into anti-rotation groove(s) 16 limit both relative radial and rotational movement between floating stator 4 and interior side of fixed stator 2. A plurality of anti-rotation grooves 16 and pins 8 may be placed around the radius of the shaft 1. The relationship of the diameters of anti-rotation pins 8 and anti-rotation grooves 16 may also be selected to allow more or less angular misalignment of the shaft. A small diameter anti-rotation pin 8 and large diameter fixed stator anti-rotation groove allow for greater relative movement of the labyrinth seal 3 in response to angular misalignment of shaft 1.

The labyrinth pattern seal grooves 14 may be pressure equalized by venting through one or more vents 9. If so desired, the vents may be supplied with a pressurized sealing fluid to over-pressurize the labyrinth area 14 and shaft seal clearance 6 to increase the efficacy of shaft seal assembly 25. A spherical interface 11 between the labyrinth seal 3 and the floating stator 4 allow for angular misalignment between the shaft 1 and fixed stator 2. O-ring channels 19 are annular with the shaft 1 and, as shown, are machined into the fixed stator 2 and positioned at the interface between the fixed stator 2 and floating stator 4. O-ring channel 19 may also be placed in the floating stator 4 for sealing contact with the fixed stator 2.

Figure 3A:
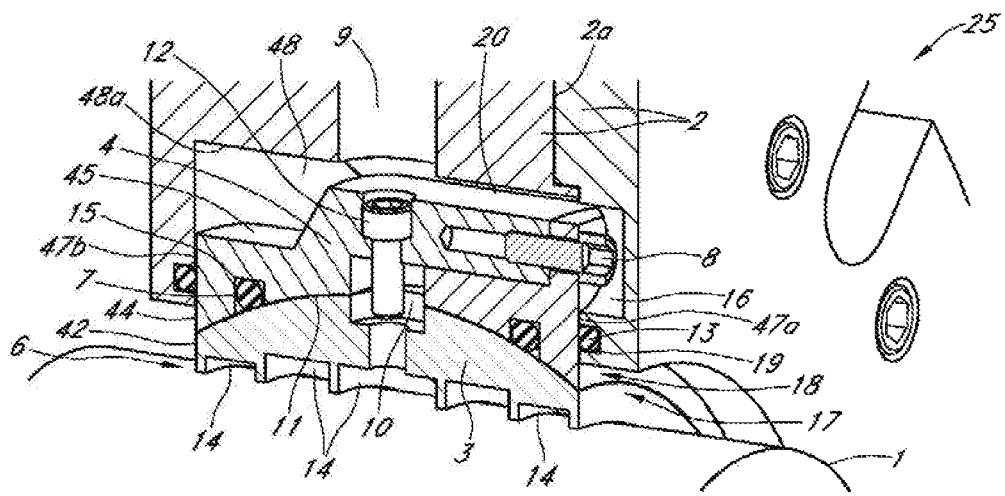
FIG. 3A illustrates the first surface seal-shaft integrity during angular and radial shaft alignment.
Figure 3B:
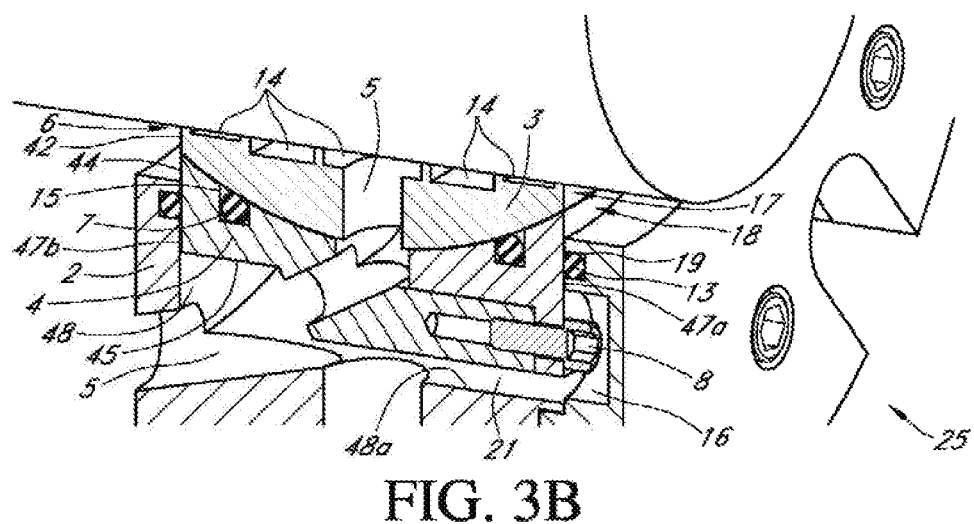
FIG. 3B illustrates second surface seal-shaft integrity during angular and radial shaft alignment.

FIG. 3A illustrates seal-shaft integrity during angular and radial shaft alignment. This view highlights the alignment of the axial face 17 of the labyrinth seal 3 and the axial face 18 of the floating stator 4. Particular focus is drawn to the alignment of the axial faces 17 and 18 at the spherical interface 11 between the floating stator 4 and labyrinth 3. FIG. 3B illustrates the shaft-seal integrity during angular and radial shaft alignment at the surface opposite that shown in FIG. 3A. This view highlights the alignment of the axial faces 17 and 18 of labyrinth seal 3 and floating stator 4, respectively, for the opposite portion of the shaft seal assembly 25 as shown in FIG. 3A. Those practiced in the arts will appreciate that because the shaft 1 and shaft seal assembly 25 are of a circular shape and nature, the surfaces are shown 360 degrees around shaft 1. Again, particular focus is drawn to the alignment of the axial faces 17 and 18 at the spherical interface 11 between the labyrinth seal 3 and floating stator 4. FIGS. 3A and 3B also illustrate the first defined clearance 20 between the floating stator 4 and the fixed stator 2 and the second defined clearance 21 between the floating stator 4 and fixed stator 2 and opposite the first defined clearance 20.

In FIGS. 2, 3, 3A and 3B, the shaft 1 is not experiencing radial, angular or axial movement and the width of the defined clearances 20 and 21, which are substantially equal, indicate little movement or misalignment upon the floating stator 4.

FIG. 4 is an exterior end view of the shaft seal assembly 25 with the rotatable shaft 1 misaligned therein. FIG. 5 is a sectional view of the first embodiment of the shaft seal assembly 25 as shown in FIG. 3 with both angular and radial misalignment of the shaft 1 applied. The shaft 1 as shown in FIG. 5 is also of the type which may experience radial, angular or axial movement relative to the fixed stator 2 portion of the shaft seal assembly 25.

As shown at FIG. 5, the defined radial clearance 6 of labyrinth seal 3 with shaft 1 has been maintained even though the angle of shaft misalignment 31 has changed. The shaft 1 is still allowed to move freely in the axial direction even though the angle of shaft misalignment 31 has changed. The arrangement of the shaft seal assembly 25 allows the labyrinth seal 3 to move with the floating stator 4 upon introduction of radial movement of said shaft 1. The labyrinth seal 3 and floating stator 4 are secured together by one or more compressed o-rings 7. Rotation of the labyrinth seal 3 within the floating stator 4 is prevented by anti-rotation means which may include a screws, pins or similar devices 12 to inhibit rotation. Rotation of the labyrinth seal 3 and floating stator 4 assembly within the fixed stator 2 is prevented by anti-rotation pins 8. The pins as shown in FIGS. 3, 3A, 3B, 5, 6 and 7 are one means of preventing rotation of the labyrinth seal 3 and floating stator 4, as recited in the claims. Lubricant or other media to be sealed by the labyrinth seal 3 may be collected and drained through a series of one or more optional drains or lubricant return pathways 5. The labyrinth seal 3 may be pressure equalized by venting through one or more vents 9. If so desired, the vents 9 may be supplied with pressurized air or other gas or fluid media to over-pressurize the labyrinth seal 3 to increase seal efficacy. The combination of close tolerances between the cooperatively engaged mechanical portions of the shaft seal assembly 25 and pressurized sealing fluid inhibit product and contaminate contact with the internals of the shaft seal assembly 25. The spherical interface 11 between the labyrinth seal 3 and the floating stator 4 allow for angular misalignment between the shaft 1 and fixed stator 2. O-ring channel 19 and o-ring 13 disposed therein cooperate with the opposing faces of the floating stator 4, which are substantially in perpendicular relation to shaft 1, to seal (or trap) fluid migration between and along engaged floating stator 4 while allowing limited relative radial (vertical) movement between stator 4 and fixed stator 2.

Figure 5A:
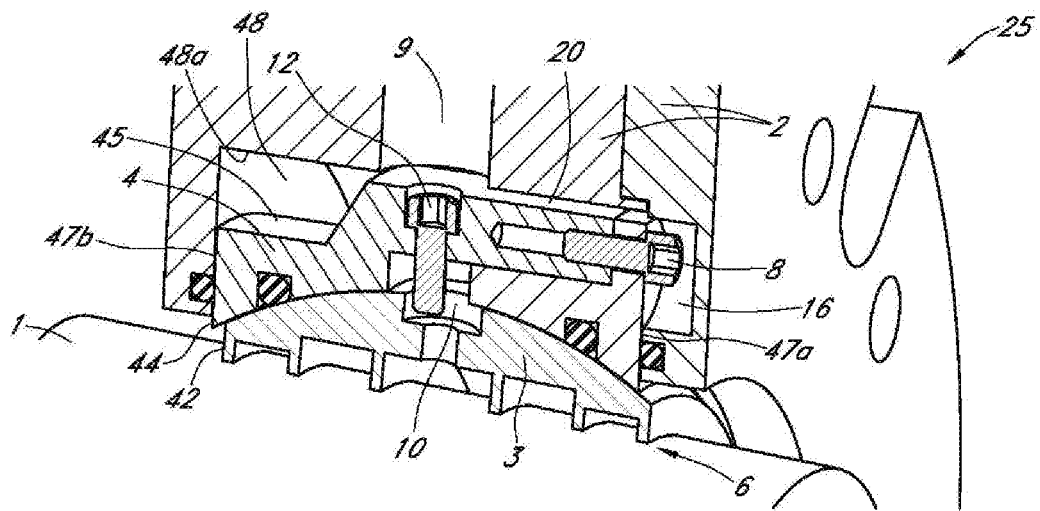
FIG. 5A illustrates first seal-shaft integrity allowed by articulation during angular and radial shaft misalignment.

FIG. 5A illustrates seal-shaft integrity allowed by the shaft seal assembly 25 during angular and radial shaft misalignment. This view highlights the offset or articulation of the axial faces 17 of the labyrinth seal in relation the axial faces 18 of the floating stator 4 for a first portion of the shaft seal assembly 25. Particular focus is drawn to the offset of the axial faces 17 and 18 at the spherical interface 11 between labyrinth seal 3 and floating stator 4.

Figure 5B:
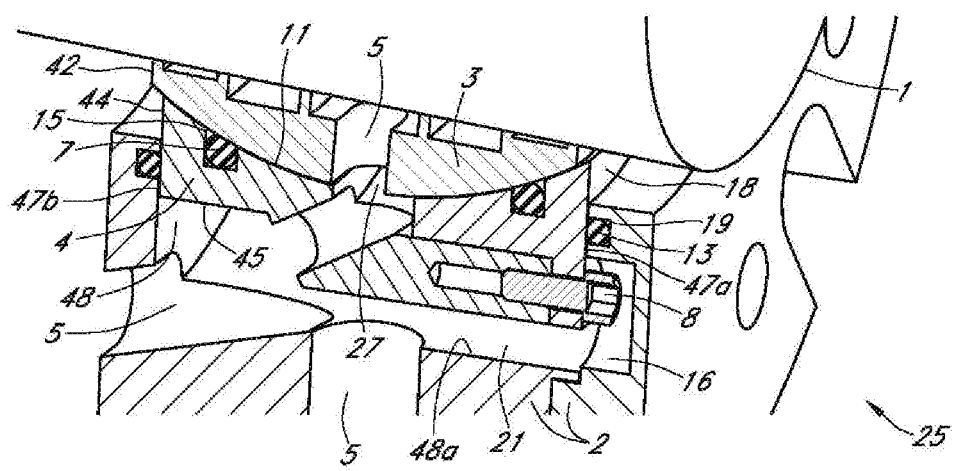
FIG. 5B illustrates second seal-shaft integrity allowed by articulation during angular and radial shaft misalignment.

FIG. 5B illustrates seal-shaft integrity for a second surface, opposite the first surface shown in FIG. 5A, during angular and radial shaft misalignment. This view highlights that during misalignment of shaft 1, axial faces 17 and 18, of the labyrinth seal 3 and floating stator 4, respectively, are not aligned but instead move (articulate) in relation to each other. The shaft to seal clearance 6 is maintained in response to the shaft misalignment and the overall seal integrity is not compromised because the seal integrity of the floating stator 4 to fixed stator 2 and the floating stator 4 to labyrinth seal 3 are maintained during shaft misalignment. Those practiced in the arts will appreciate that because the shaft 1 and shaft seal assembly 25 are of a circular shape and nature, the surfaces are shown 360 degrees around shaft 1.

FIGS. 5A and 5B also illustrate the first clearance or gap 20 between the floating stator 4 and the fixed stator 2 and the second clearance or gap 21 between the floating stator 4 and fixed stator 2 and opposite the first clearance or gap 20.

In FIGS. 4, 5, 5A and 5B, the shaft 1 is experiencing radial, angular or axial movement during rotation of the shaft 1 and the width of the gaps or clearances 20 and 21, have changed in response to said radial, angular or axial movement. (Compare to FIGS. 3, 3A and 3B.) The change in width of clearance 20 and 21 indicate the floating stator 4 has moved in response to the movement or angular misalignment of shaft 1. The shaft seal assembly 25 allows articulation between axial faces 17 and 18, maintenance of spherical interface 11 and radial movement at first and second clearance, 20 and 21, respectively, while maintaining shaft seal clearance 6.

FIG. 6 is a sectional view of a second embodiment of the shaft seal assembly 25 as shown in FIG. 2 for over-pressurization with alternative labyrinth seal pattern grooves 14. In this figure the labyrinth seal pattern grooves 14 are composed of a friction reducing substance such as polytetrafluoroethylene (PTFE) that forms a close clearance to the shaft 1. PTFE is also sometimes referred to as Teflon® which is manufactured and marketed by Dupont. PTFE is a plastic with high chemical resistance, low and high temperature capability, resistance to weathering, low friction, electrical and thermal insulation, and "slipperiness." The "slipperiness" of the material may also be defined as lubricous or adding a lubricous type quality to the material. Carbon or other materials may be substituted for PTFE to provide the necessary sealing qualities and lubricous qualities for labyrinth seal pattern grooves 14.

Pressurized sealing fluids are supplied to over-pressurize the lubricious labyrinth pattern 26 as shown in FIG. 6. The pressurized sealing fluids make their way into the annular groove 23 of the throttle 26 through one or more inlets. Throttle 26 is also referred to as "an alignment skate" by those practiced in the arts. Throttle 26 allows the labyrinth seal 3 to respond to movement of the shaft caused by the misalignment of the shaft 1. The pressurized sealing fluid escapes past the close clearance formed between the shaft 1 and labyrinth seal 3 having throttle 26. The close proximity of the throttle 26 to the shaft 1 also creates resistance to the sealing fluid flow over the shaft 1 and causes pressure to build-up inside the annular groove 23. Floating annular groove 27 in cooperation and connection with annular groove 23 also provides an outlet for excess sealing fluid to be "bled" out of shaft seal assembly 25 for pressure equalization or to maintain a continuous fluid purge on the shaft sealing assembly 25 during operation. An advantage afforded by this aspect of the shaft sealing assembly 25 is its application wherein "clean-in place" product seal decontamination procedures are preferred or required. Examples would include food grade applications.

FIG. 7 illustrates shaft seal assembly 25 with the anti-rotation pin 12 removed to improve visualization of the inlets. These would typically exist, but are not limited to, a series of ports, inlets or passages about the circumference of the shaft seal assembly 25. FIG. 7 also shows the shape and pattern of the labyrinth seal 3 may be varied. The shape of throttles 26 may also be varied as shown by the square profile shown at throttle groove 22 in addition to the circular-type 26. Also note that where direct contact with the shaft 1 is not desired, the shaft seal assembly 25 be used in combination with a separate sleeve 24 that would be attached by varied means to the shaft 1.

Figure 8:
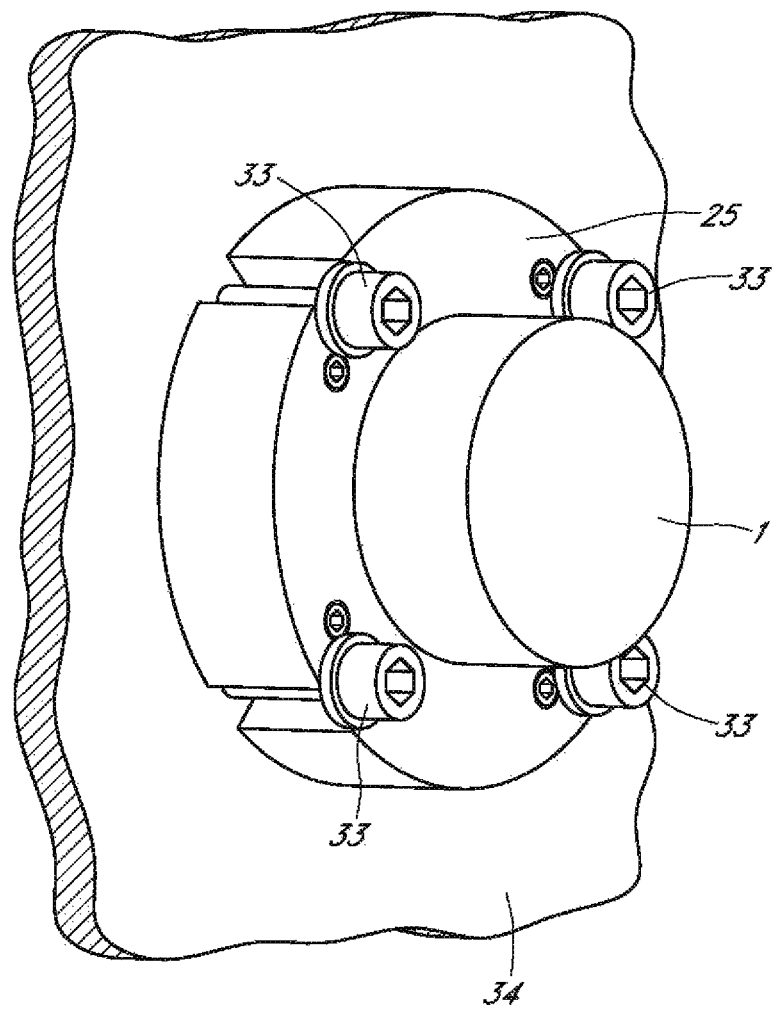
FIG. 8 is a perspective view of a fourth embodiment as mounted to a vessel wall.

FIG. 8 shows that another embodiment of the present disclosure wherein the shaft seal assembly 25 has been affixed to a vessel wall 34. The shaft seal assembly 25 may be affixed to vessel wall 34 through securement means such as mounting bolts 33 to ensure improved sealing wherein shaft 1 is subjected to angular misalignment. The mounting bolts 33 and slots (not numbered) through the shaft seal assembly 25 exterior are one means of mounting the shaft seal assembly 25, as recited in the claims.

Element Listing (FIGS. 9-18D)

| Description | Element No. |
| --- | --- |
| Shaft | 10 |
| Bearing isolator | 18 |
| Housing | 19 |
| Rotor | 20 |
| Stator | 30, 31a |
| Fixed stator | 31 |
| Passage | 40, 40a |
| Spherical surface | 50, 51 |
| Clearance | 52 |
| Frictional seal | 60 |
| Flange unit | 61a |
| Center point | 80 |
| Conduit | 99 |
| Fluid | 100 |
| Pin | 101 |
| Annular recess | 102 |
| Shaft seal assembly | 200 |
| Multi-shaft seal assembly | 202 |
| Fastener | 204 |
| Aperture | 206 |
| Fixed stator | 210 |
| Main body | 211 |
| Face plate | 212 |
| Pin recess | 212a |
| Inlet | 214 |
| Annular recess | 216 |
| Sealing member | 218 |
| Floating stator | 220 |
| Radial exterior surface | 222 |
| Pin | 224 |
| First radial passage | 226 |
| Concave surface | 228 |
| Rotor | 230 |
| Roller cavity | 232 |
| Cavity wall | 233 |
| Roller | 234 |
| Second radial passage | 236 |
| Convex surface | 238 |
| First seal | 240 |
| Collar | 241 |
| Collar lip | 241a |
| Collar cutaway | 242 |
| Second seal | 250 |
| Cutaway | 251 |
| Shaft seal assembly | 300 |

-continued

| Description | Element No. |
| --- | --- |
| O-ring channel | 302 |
| O-ring | 303 |
| Unitizing ring | 304 |
| Slip ring | 305 |
| First cooperating cavity | 306a |
| Second cooperating cavity | 306b |
| Axial passage | 307 |
| Radial passage | 308 |
| Stator | 310 |
| Stator body | 311 |
| Shoulder | 312 |
| Radial bore | 313 |
| Axial projection | 314 |
| Radial projection | 315 |
| Axial channel | 316 |
| Radial channel | 317 |
| Unitizing ring channel | 318 |
| Rotor | 320 |
| Rotor body | 321 |
| Rotor axial projection | 324 |
| Rotor radial projection | 325 |
| Rotor axial channel | 326 |
| Rotor radial channel | 327 |
| Rotor unitizing ring channel | 328 |

Figure 9:
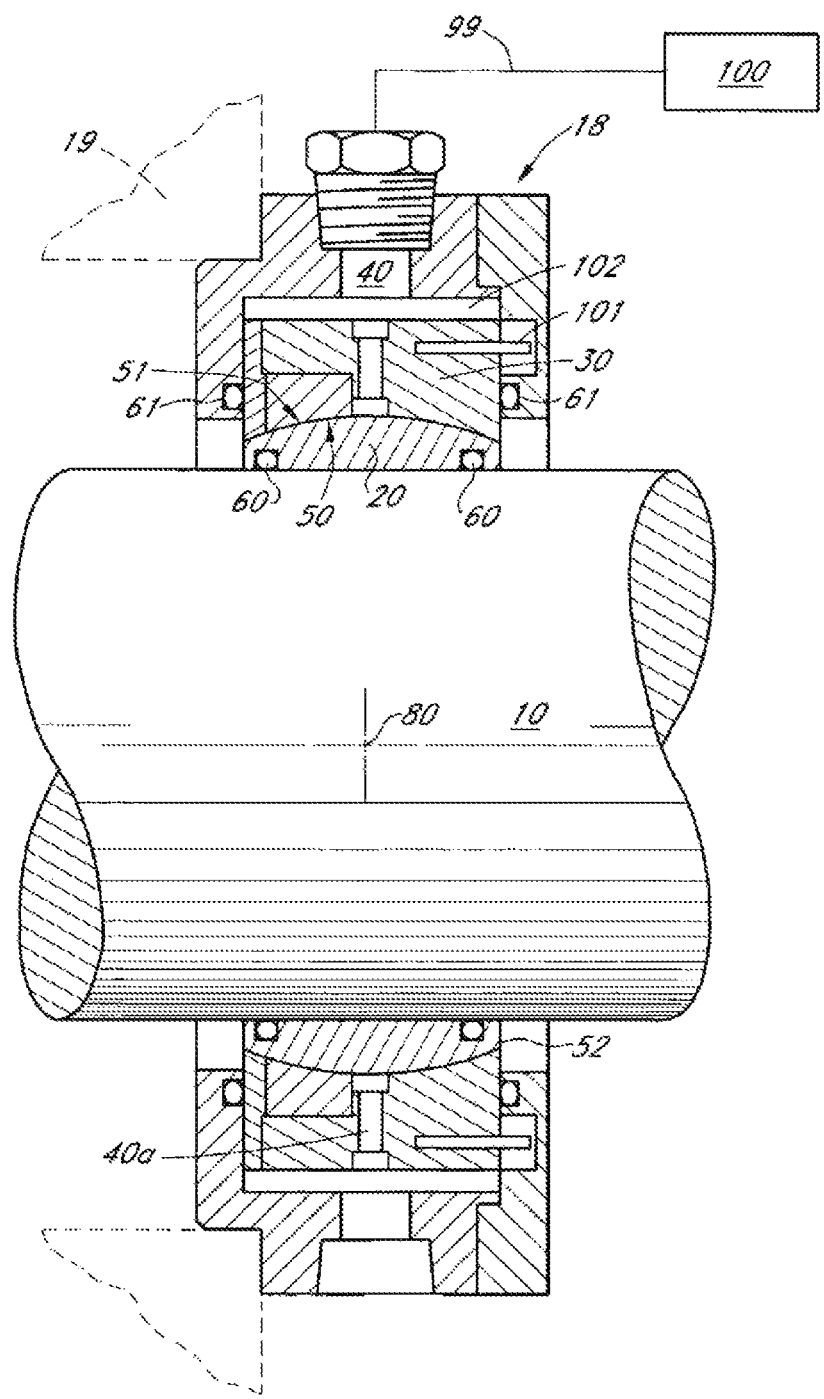
FIG. 9 is a cross-sectional of view of one embodiment of the shaft seal assembly with the shaft aligned with respect to the housing.

FIG. 9 shows another embodiment of a bearing isolator 18 mounted on a shaft 10. The shaft 10 extends through the bearing isolator 18 and the housing 19. A source of gas or fluid, 100 which may include water or lubricant, may also be in communication with the bearing isolator 18 via conduit 99. The rotor 20 is affixed to the shaft 10 by means by a frictional seal 60, which may be configured as one or more o-rings. The rotor 20 follows the rotational movement of the shaft 10 because of the frictional engagement of the seals 60. The passages 40 and 40a are as shown but will not be described in detail here because such description is already understood by those skilled in the art.

Figure 11:
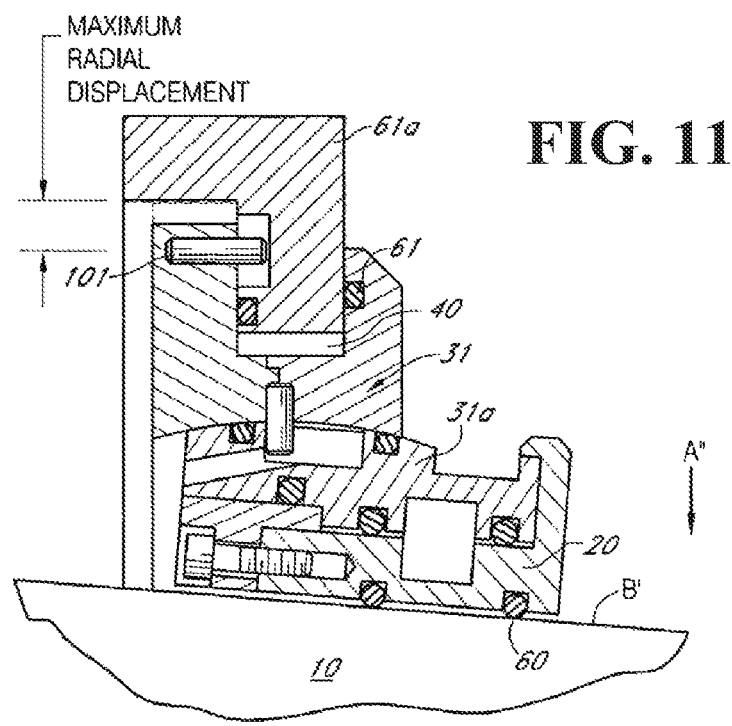
FIG. 11 is a cross-sectional view of the embodiment shown in FIG. 10 with the shaft misaligned with respect to the housing.
Figure 12:
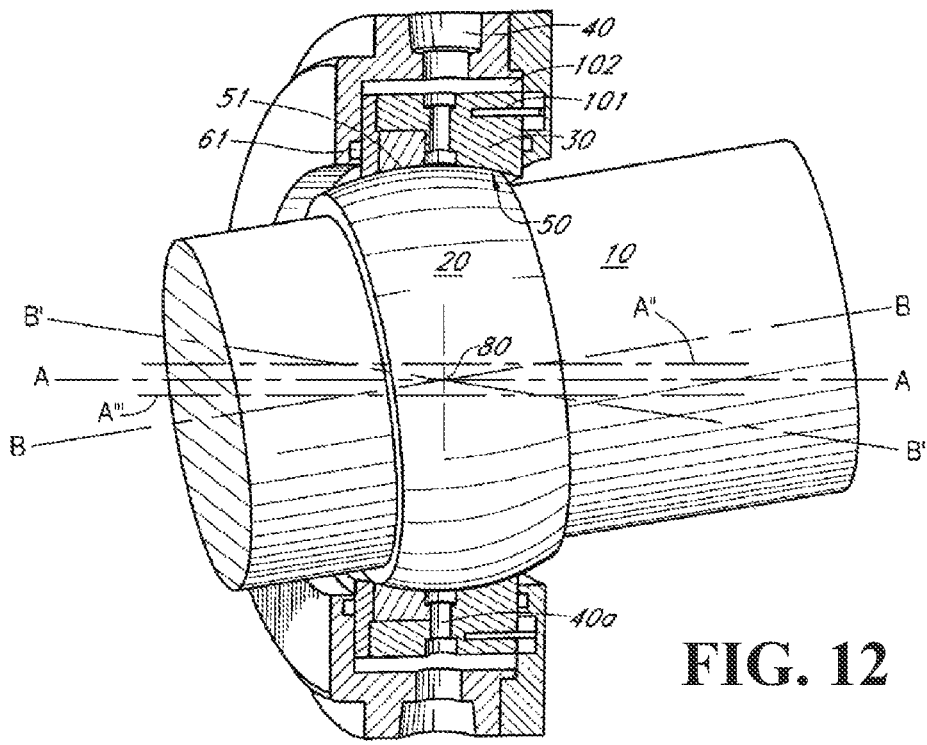
FIG. 12 is a cross-sectional view of the embodiment shown in FIG. 9 of the invention showing the shaft misaligned with respect to the housing.
Figure 13:
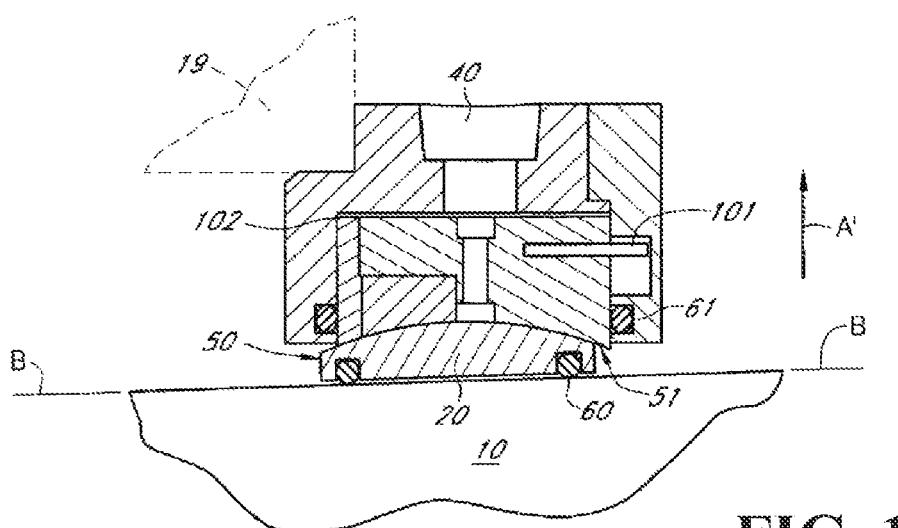
FIG. 13 is a cross-sectional view of the embodiment shown in FIG. 9 showing the shaft misaligned with respect to the housing.

A pair of corresponding spherical surfaces 50 and 51 may be used to create a self-aligning radial clearance 52 between the rotor 20 and the stator 30 prior to, during, and after use. This clearance 52 may be maintained at a constant value even as the shaft 10 becomes misaligned during use. Various amounts and direction of misalignment between the centerline of the shaft 10 and the housing 19 are illustrated in FIGS. 11-13. An annular recess 102 between the stator 30 and fixed stator 31 allows the bearing isolator 18 to accommodate a predetermined amount of radial shaft displacement.

In the embodiments shown herein, the spherical surfaces 50, 51 have a center point identical from the axial faces of both the rotor and stator 20, 30, respectively. However, the spherical surfaces 50, 51 may be radially, and/or as shown, vertically spaced apart. These spherical surfaces 50, 51 may move radially in response to and/or in connection with and/or in concert with the radially positioning of other components of the bearing isolator 18. Typically, if the shaft 10 becomes misaligned with respect to the housing 19, the rotor 20 will consequently become misaligned with respect thereto, and then the spherical surfaces 50, 51 and/or the stator 30 moving radially within the annular recess of the fixed stator 31 may compensate for the misalignment.

FIGS. 11 and 13 illustrate that in one embodiment of the bearing isolator 18, the rotor 20 may move with respect to the stator 30, 31 as shaft 10 is misaligned with respect to housing 19 through the interaction between spherical surfaces 50, 51 so as to ensure the distances between the center points of the rotor 20 and stator 30 and a fixed point on the housing 19 are constant.

Figure 10:
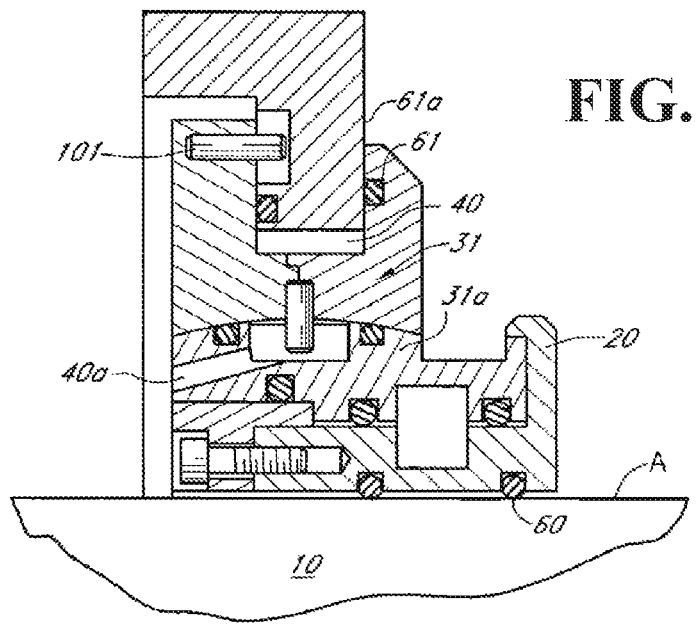
FIG. 10 is a cross-sectional view of another embodiment of the shaft seal assembly with the shaft aligned with respect to the housing.

In the embodiment of the bearing isolator 18 shown in FIGS. 10 & 11, the spherical surfaces 50, 51 may be positioned on a fixed stator 31 and stator 31a rather than on the rotor 20 and stator 30. Still referring to FIGS. 10 & 11, this design allows the rotor 20 and stator 31a to move with respect to the fixed stator 31, flange unit 61a, and housing 19. The rotor 20, stator 31a, and fixed stator 31 may move radially with respect to the flange unit 61a (and consequently with respect to the housing 19) as best shown in FIG. 11. In this embodiment of the bearing isolator 18 there is a very minimal amount of relative rotation between the spherical surfaces 50, 51.

The embodiment of the bearing isolator 18 shown in FIGS. 10 & 11 may provide for controlled radial movement of the fixed stator 31, stator 31a, and rotor 20 with respect to flange unit 61a, which flange unit 61a may be securely mounted to a housing 19. Rotational movement of the fixed stator 30 with respect to the flange unit 61a may be prevented by anti-rotational pins 101. The fixed stator 31 may be frictionally secured to the flange unit 61a using a frictional seal 61, which may be made of any material with sufficient elasticity and frictional characteristics to hold the fixed stator 31 in a fixed radial position with respect to the flange unit 61a but still be responsive to the radial forces when the shaft 10 is misaligned. Changes to the radial position of the fixed stator 31, stator 31a, and rotor 20 and the resulting positions thereof (as well as the resulting position of the interface between the fixed stator 31 and stator 31a) occurs until the radial force is fully accommodated or unit the maximum radial displacement of the bearing isolator 18 is reached.

In operation, the rotor 20 may be moved radially as shaft 10 is misaligned with respect to the housing 19. Radial movement of the spherical surfaces 50, 51 between the stator 31a and fixed stator may result from this pressure. FIG. 3 shows the resultant radial movement of center point 80 as the shaft 10 is misaligned. During normal operation, the shaft 10 is typically horizontal with respect to the orientation shown in FIG. 3, as represented by line A. As the shaft 10 becomes misaligned in a manner represented by line B, the center point 80 may move to a point along line A". As the shaft 10 becomes misaligned in a manner represented by line B', the center point 80 may move to a point along line A'. However, in other shaft 10 misalignments, the radial positions of the rotor 20, stator 30, and/or fixed stator 31 may be constant and the spherical surfaces 50, 51 may compensate for the shaft misalignment. From the preceding description it will be apparent that the bearing isolator 18 provides a constant seal around the shaft 10 because the distance between the spherical surfaces 50, 51 is maintained as a constant regardless of shaft 10 misalignment of a normal or design nature.

The physical dimensions of the spherical surfaces 50 and 51 may vary in linear value and in distance from the center point 80, depending on the specific application of the bearing isolator. These variations will be utilized to accommodate different sizes of shafts and seals and different amounts of misalignment.

Axial Displacement Shaft Seal Assembly

Figure 14:
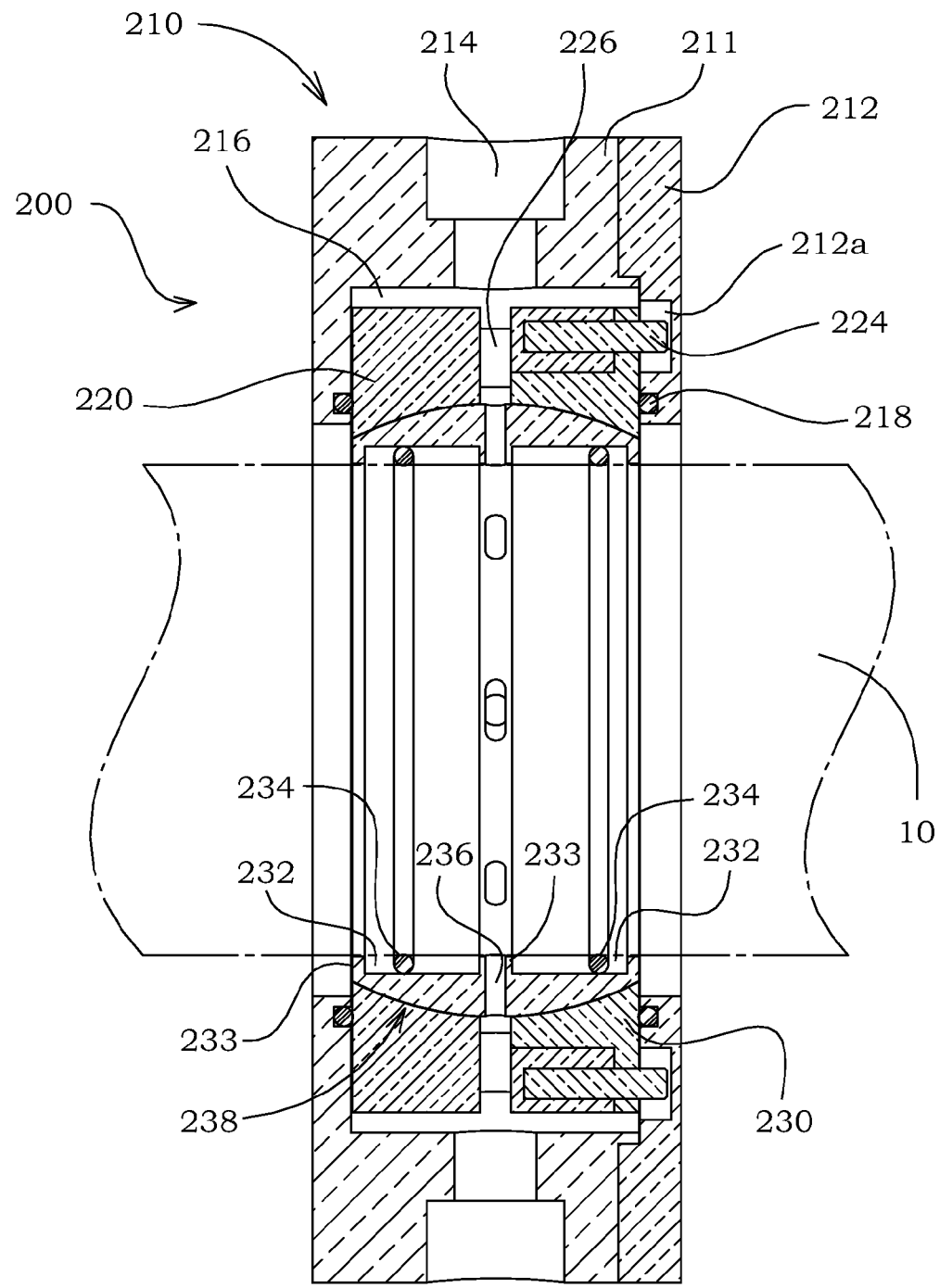
FIG. 14 is a cross-sectional view of a third embodiment of the shaft seal assembly.
Figure 14A:
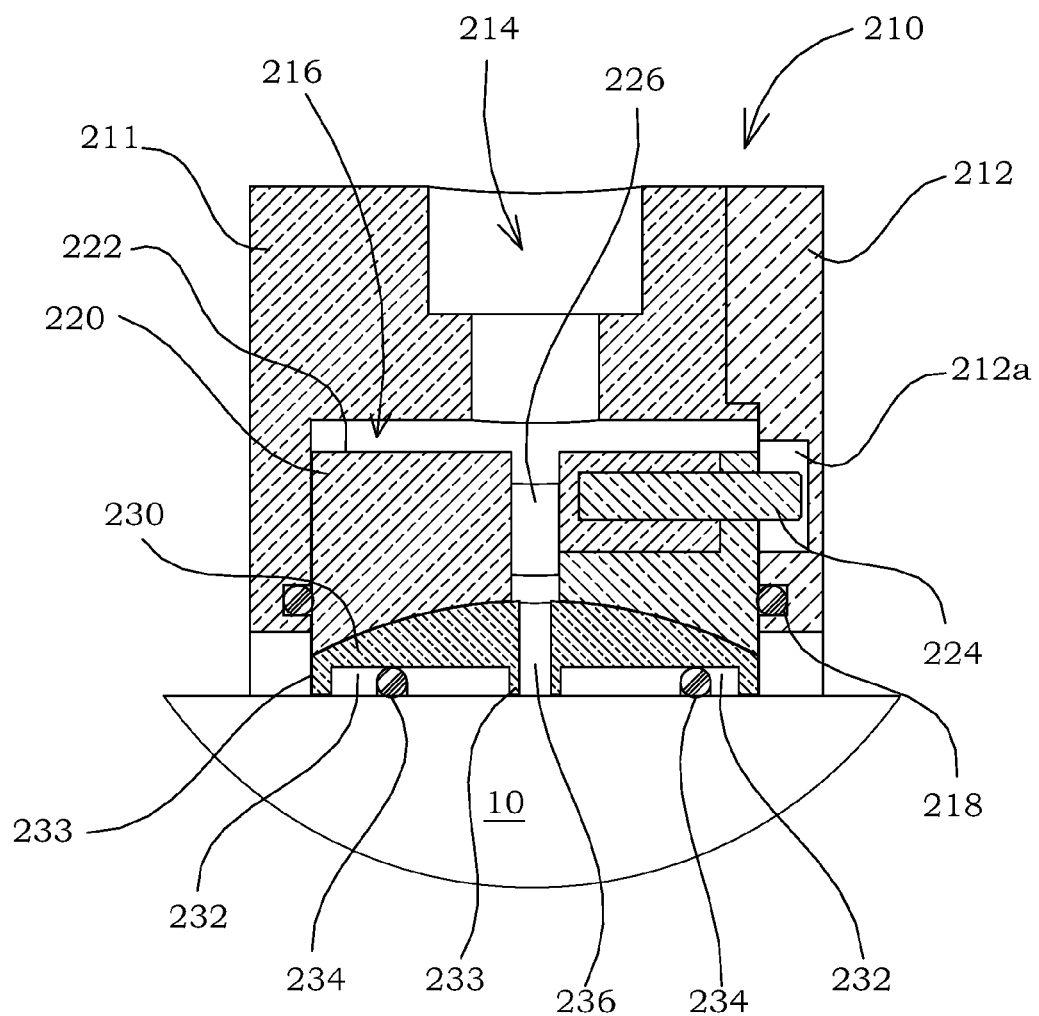
FIG. 14A is a detailed cross-sectional view of the interface between the rotor and the shaft of the third embodiment of the shaft seal assembly.

Another embodiment of a shaft seal assembly 200 is shown in FIGS. 14 & 14A. This embodiment is similar to the embodiment of the bearing isolator 18 described above and shown in FIGS. 9, 12, & 13. The shaft seal assembly 200 may include a fixed stator 210, floating stator 220, and a rotor 230, as shown. In the pictured embodiment, the rotor 230 typically rotates with the shaft 10 while the fixed stator 210 and stator 220 do not. Accordingly, a rotational interface may exist between a concave surface 228 of the floating stator 220 and a convex surface 238 of the rotor 230. In other embodiments of the shaft seal assembly 200 not pictured herein, but which embodiments are a corollary to the embodiment of the bearing isolator 18 shown in FIGS. 10 & 11, the floating stator 220 may be configured with a convex surface that corresponds to a concave surface of the fixed stator. In such an embodiment, the rotational interface may be located at a position other than the interface between the concave and convex surfaces.

The embodiment of the shaft seal assembly 200 shown in FIGS. 14 & 14A includes a fixed stator 210 that may be securely mounted to a housing (not shown in FIGS. 14 & 14A) my any suitable methods and/or structure. The fixed stator 210 may include a main body 211 and a face plate 212 that may be secured to one another. It is contemplated that a fixed stator 210 formed with a main body 211 and face plate 212 may facilitate ease of installation of the shaft seal assembly 200 in certain applications. In such applications, the main body 211 may be affixed to the housing, the rotor 230 and floating stator 220 may be positioned appropriately, and then the face plate 212 may be secured to the main body 211.

The fixed stator 210 may be formed with an annular recess 216 into which a portion of the floating stator 220 and/or rotor 230 may be positioned. A predetermined clearance between the radial exterior surface 222 of the floating stator 220 and the interior surface of the annular recess 216 may be selected to allow for relative radial movement between the fixed stator 210 and floating stator 220. At least one pin 224 may be affixed to the floating stator 220, and a portion of the pin 224 may extend into a pin recess 212a formed in the face plate 212 so as to prevent the floating stator 220 from rotating with the rotor 230. The axial interfaces between the floating stator 220 and fixed stator 210 may be sealed with sealing members 218, which sealing members may be configured as o-rings.

The floating stator 220 may also be formed with a concave surface 228 in a radial interior portion thereof. This concave surface 228 may form a semi-spherical interface with a corresponding convex surface 238 formed in the radial exterior portion of the rotor 230. Accordingly, the shaft seal assembly 200 shown in FIGS. 14 & 14A accommodates shaft 10 misalignment and radial movement in an identical and/or similar manner to that previously described for the bearing isolators 18.

The shaft seal assembly 200 may be configured to accommodate for axial movement of the shaft 10. In the pictured embodiment this is accomplished by forming at least one roller cavity 232 in the rotor 230 adjacent the shaft 10. The illustrative embodiment includes two roller cavities 232 bound by a cavity wall 233 on either end thereof. At least one roller 234 may be positioned in each roller cavity 232. Axial movement of the shaft 10 may be accommodated by a roller 234 rolling along the surface of the shaft 10 and within the roller cavity 232. The illustrative embodiment includes two roller cavities 232 with one roller 234 in each roller cavity 232, but the shaft seal assembly 200 is in no way limited by the number of roller cavities 232 and/or rollers 234 associated therewith. The roller(s) 234 may be constructed of any suitable material for the specific application of the shaft seal assembly 200. It is contemplated that an elastomeric material (e.g., rubber, silicon rubber, other polymers) will be especially suitable for many applications.

The illustrative embodiment of the shaft seal assembly 200 also includes various fluid conduits for applying a sealing fluid to the shaft seal assembly 200. The fixed stator 210 is formed with an inlet 214 for introduction of a sealing fluid to the shaft seal assembly 200. The inlet 214 may be in fluid communication with one or more first radial passages 226 in the floating stator 220, which first radial passages 226 may in turn be in fluid communication with one or more second radial passages 236 in the rotor 230. The roller(s) 234, roller cavity(ies) 232, and cavity wall(s) 233 may be configured so that the sealing fluid introduced to the inlet 214 exits the shaft seal assembly 200 from an area between the rotor 230 and shaft 10 at a predetermined rate for a given set of operation parameters (e.g., sealing fluid viscosity and pressure, shaft 10 rpm, etc.). The illustrative embodiment of the shaft seal assembly 200 may be formed with eight first radial passages 226 formed in the floating stator 220, which correspond to eight second radial passages 236 formed in the rotor 230, and the first radial passages 226 and second radial passages 236 may be evenly spaced about the circumference of the shaft seal assembly 200. However, in other embodiments, different numbers, spacing, and/or configurations of the first radial passages 226 and/or second radial passages 236 may be used without departing from the spirit and scope of the shaft seal assembly 200 as disclosed and claimed herein.

In an embodiment of the shaft seal assembly 200 not pictured herein, but which embodiment is a corollary to that shown in FIGS. 10 & 11. It will be apparent in light of the present disclosure that in such an embodiment, the rotor 20 will include at least one roller cavity adjacent the shaft 10 with at least one roller positioned therein rather than a frictional seal 60. As with the previous embodiments of the shaft seal assembly 200 described herein, the roller(s) may be configured to rotatively couple the rotor 20 with the shaft 10. The rotor cavity and/or roller may be also be configured to allow the shaft 10 to move axially with respect to the shaft sealing assembly 200.

Multi-Shaft Seal Assembly

Figure 15:
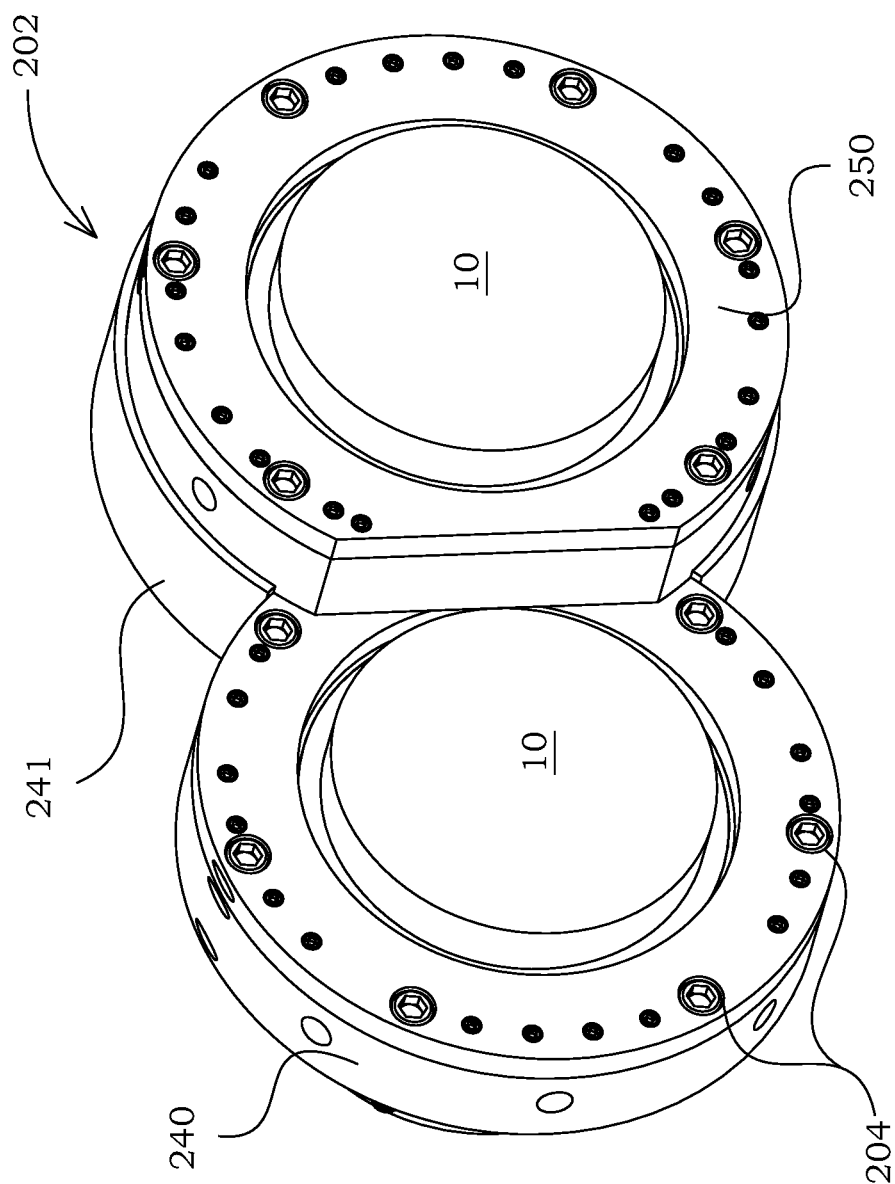
FIG. 15 is a perspective view of a first embodiment of a multi-shaft seal assembly.
Figure 15A:
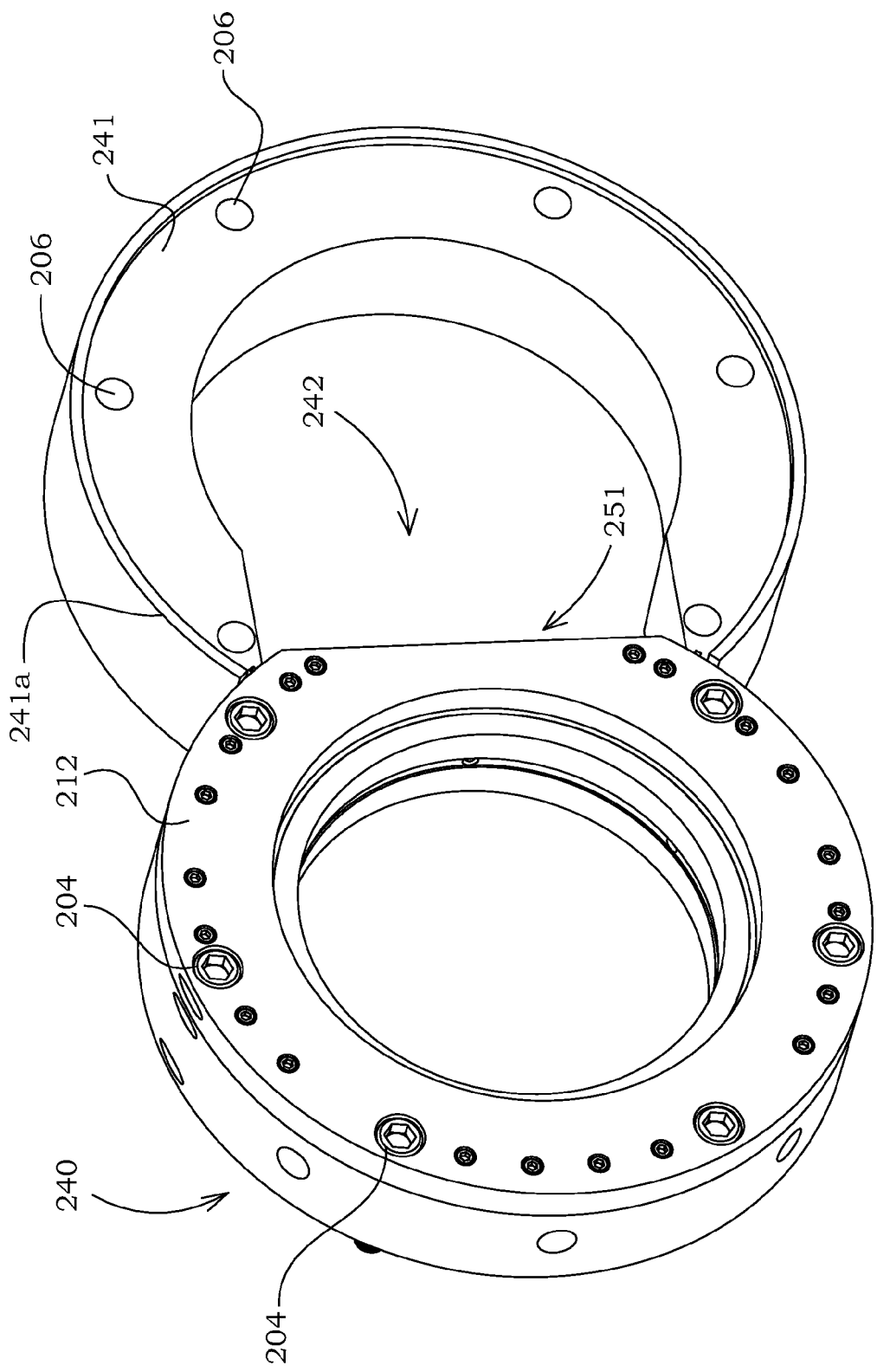
FIG. 15A is a perspective view of the embodiment of a multi-shaft seal assembly shown in FIG. 15 with the second seal removed for clarity.

FIG. 15 provides a perspective view of a first embodiment a multi-shaft seal assembly 202. It is contemplated that a multi-shaft seal assembly 202 may be especially useful in applications wherein two shafts 10 are positioned in relative close proximity to one another, as shown for the illustrative embodiment pictured herein. The shafts 10 pictured herein are also oriented such that the longitudinal axes thereof are parallel with respect to one another. However, the multi-shaft seal assembly 202 is not so limited, and other embodiments thereof exist for use with shafts 10 that are oriented differently than those pictured herein.

The illustrative embodiment of the multi-shaft seal assembly 202 includes a first seal 240. A sealing portion of the first seal 240 surrounds one shaft 10 and may be configured to operate in a manner substantially similar to other bearing isolators 18 and/or shaft seal assemblies 25, 200 disclosed herein or otherwise. A sealing portion of a second seal 250 surrounds the other shaft 10 and also may be configured to operate in a manner substantially similar to other bearing isolators 18 and/or shaft seal assemblies 25, 200 disclosed herein or otherwise. For example, FIG. 17 provides an axial, cross-sectional view of a first embodiment of the multi-shaft seal assembly 202, wherein both the first and second seals 240, 250 are configured to operate in a manner substantially similar to the bearing isolator 18 shown in FIGS. 9-13. However, in other embodiments of the multi-shaft seal assembly 202, either the first or second seal 240, 250 may be differently configured. For example, the first and second seals 240, 250 may be configured like the embodiment of a shaft seal assembly 200 shown in FIGS. 14 & 14A. Furthermore, in other embodiments of the multi-shaft seal 202, the first seal 240 and second seal 250 may be configured differently from one another. For example, the first seal 240 may be configured to operate in a manner substantially similar to the bearing isolator 18 shown in FIGS. 9-13 and the second seal 250 may be configured to operate in a manner substantially similar to the shaft seal assembly 200 shown in FIGS. 14 & 14A. Accordingly, the specific internal configuration of either the first or second seal 240, 250 in no way limits the scope of the multi-shaft seal assembly 202 as disclosed herein.

Figure 16:
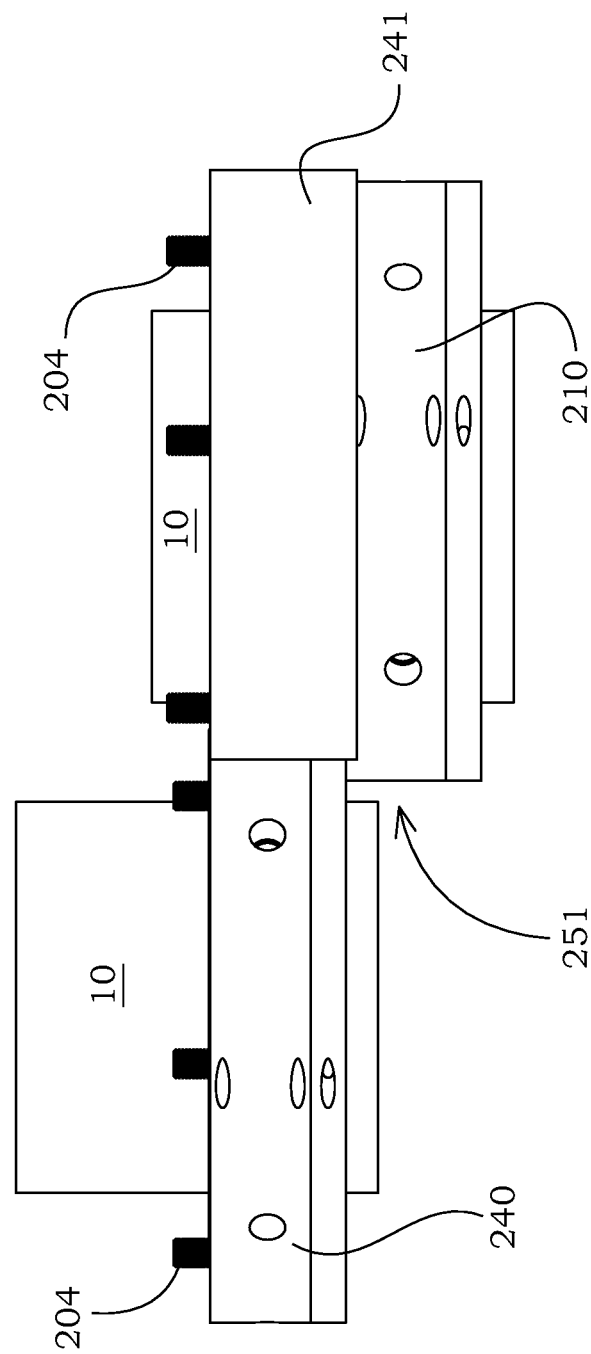
FIG. 16 is a plane vertical view of the embodiment shown in FIG. 15.

As shown in FIG. 17, each seal 240, 250 may be configured to include a fixed stator 210, floating stator 220, face plate 212, and a rotor 220, all of which are shown in FIG. 17 as being configured to operate in a manner substantially similar to the embodiment of a bearing isolator 18 as shown in FIGS. 9-13, as previously mentioned. The rotor 230 may be secured to a shaft 10 such that the rotor 230 is coupled thereto and rotates therewith in any suitable manner (several of which are described above for other embodiments of a bearing isolator 18 and/or shaft seal assemblies 25, 200). The fixed stator 210 may be secured to a housing 19 in any suitable manner (several of which are described above for other embodiments of a bearing isolator 18 and/or shaft seal assemblies 25, 200 and which include but are not limited to mechanical fasteners 204, chemical adhesives, welding, interference fit, and/or combinations thereof). One such suitable manner includes fasteners 204 as shown in FIGS. 15, 16, & 18 and corresponding apertures 206. The floating stator 220 may be positioned within a portion of an annular recess 216 formed in the fixed stator 10, wherein the exterior axial boundary of the annular recess 216 may be defined by the interior surface of a face plate 212, which may be engaged with the fixed stator 210 as previously described for other embodiments of the bearing isolator 18 and shaft seal assemblies 25, 200.

The fixed stator 210, floating stator 220, rotor 230, and/or face plate 212 may cooperate to form a labyrinth seal. The fixed stator 210, floating stator 220, and/or the rotor 230 may be constructed in a two-piece manner. As mentioned, in the illustrative embodiment, the fixed stator 210 may be configured to engage a face plate 212 via a plurality of fasteners 204, which may be distinct from the fasteners 204 used to engage the fixed stator 210 with the housing 19. Other methods and/or structures for engaging the face plate 212 with the fixed stator 210 may be used without limitation. Additionally, an interface between two portions of the rotor 230, two portions of the fixed stator 210, the fixed stator 210 and the floating stator 220, the rotor 230 and the floating stator 220, and/or the rotor 230 and fixed stator 210 may be semi-spherical, as shown for the interface between the rotor 230 and floating stator 220 for the embodiment pictured in FIG. 17. Furthermore, the seals 240, 250 may be formed with an inlet 214 therein, as previously described for the other embodiments of a bearing isolator 18 and shaft seal assemblies 25, 200 disclosed herein to provide a sealing fluid to various passages within the multi-shaft seal assembly 202.

To accommodate two shafts 10 in relative close proximity, the illustrative embodiment of a multi-shaft seal assembly 202 employs a configuration in which the first and second seals 240, 250 are configured in a stacked arrangement (see FIGS. 16 & 17). That is, the first seal 240 may reside in a different radially oriented plane than that in which the second seal 250 resides. In the illustrative embodiment, the planes are parallel with respect to one another. However, in other embodiments of the multi-shaft seal assembly 202 not pictured herein, the planes may have other orientations, which orientations may be dependent at least in part on the orientation of the shafts 10 and/or housing 19.

A collar 241 may be secured to the housing 19 and/or the first seal 240 to provide the proper axial spacing for the stacking arrangement of the first and second seals 240, 250. In the illustrative embodiment the collar 241 may be formed separately from either the first seal 240 or the housing 19, and later secured to the first seal 240 and/or housing 19. As clearly shown in FIG. 15B, which provides a rear side perspective view of the illustrative embodiment of a multi-shaft seal assembly 202, the collar 241 may be formed with a collar cutaway 242 therein to accommodate a portion of the second seal 250. As shown, the collar cutaway 242 may be configured with an angled portion to interface with the exterior surface of the first seal 240.

Figure 15B:
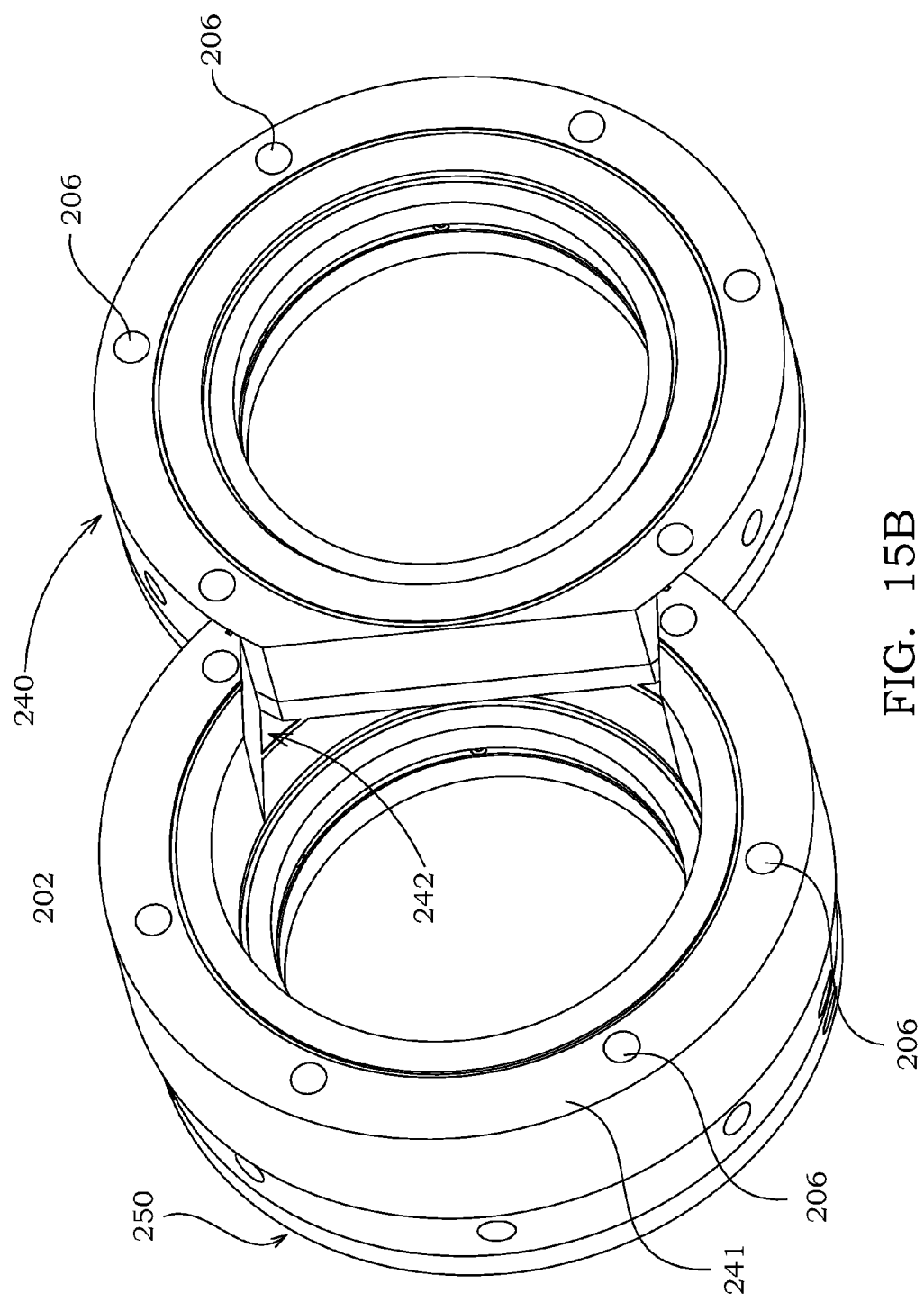
FIG. 15B is a rear perspective view of the embodiment of a multi-shaft seal assembly shown in FIG. 15.

In most applications, the surface prominently shown in FIG. 15B is adjacent a housing 19 during use of the multi-shaft seal assembly 202. Accordingly, the surface of the collar 241 and/or first seal 240 adjacent the housing 19 may be formed with an o-ring channel therein to accommodate an o-ring. An o-ring so positioned may serve to prevent air and/or other fluid from egress/ingress between the collar 241 and housing 19 and/or between the first seal 240 and housing 19. The specific shape, dimensions, and/or configuration of the collar cutaway 242 will vary from one embodiment of the twin-shaft seal assembly 202 to the next, and may be at least dependent upon the spacing of the shafts 10 and/or configuration of the first and second seals 240, 250, and is therefore in no way limiting to the scope of the multi-shaft seal assembly 202. As shown for the illustrative embodiment, the collar 241 may be secured to the housing 19 via one or more fasteners 204 and corresponding apertures 206. However, in other embodiments of the multi-shaft seal assembly 202 pictured herein, the collar 241 may be integrally formed with a portion of the first seal 240. In still other embodiments of the multi-shaft seal assembly 202 not pictured herein the collar 241 may be integrally formed with the housing 19. In another embodiment of a multi-shaft seal assembly 202 not pictured herein the collar 241 may be integrally formed with the second seal 250. Accordingly, the multi-shaft seal assembly 202 is not limited by the specific configuration of the first collar 241 with respect to the housing 19, first seal 240, and/or second seal 250.

The collar 241 may serve as an axial spacer between the equipment housing and the second seal 250 as clearly shown in FIGS. 16 & 17. In this embodiment, the axial dimension of the collar 241 is approximately equal to that of the first and second seals 240, 250. However, the collar 240 may be formed with a collar lip 241a into which a portion of the second seal 250 may seat, as shown in FIG. 17. Accordingly, in applications wherein the radial dimension of the first and/or second seal 240, 250 is too great for mounting thereof in the same radial plane due to the spacing of two adjacent shafts 10, the first and second seals 240, 250 may be applied to the shafts 10 in an axially offset configuration.

The multi-shaft seal assembly 202 may also include a cutaway 251 formed in a portion of the second seal 250. A cutaway 251 may be required to accommodate certain configurations of adjacent shafts 10 wherein the shafts 10 are in relative close proximity to one another. As best shown in FIGS. 16 & 18, the configuration of shafts 10 in the illustrative embodiment of the multi-shaft seal assembly 202 are in relatively close proximity to one another such that the second seal 250 must be formed with a cutaway 251 to accommodate adequate clearance with the shaft 10 corresponding to the first seal 240. However, in other configurations of adjacent shafts 10, the multi-shaft seal assembly 202 may not require a cutaway 251. Accordingly, the multi-shaft seal assembly 202 is in no way limited the presence, absence, and/or configuration of a cutaway 251. Generally, a cutaway 251 may reduce the radial dimension of the fixed stator 210 and/or face plate 212, as shown in FIG. 17. However, in other configurations the cutaway 251 may alternatively or additional reduce the radial dimension of the floating stator 220 and/or rotor 230.

Although the illustrative embodiment of a multi-shaft seal assembly 202 is configured to accommodate two shafts 10, other embodiments not pictured herein are configured to accommodate more than two shafts 10. Accordingly, the multi-shaft seal assembly 202 is not limited by the number of shafts 10 and/or seals 240, 250 associated therewith.

Additional Embodiments of a Shaft Seal Assembly

Figure 18A:
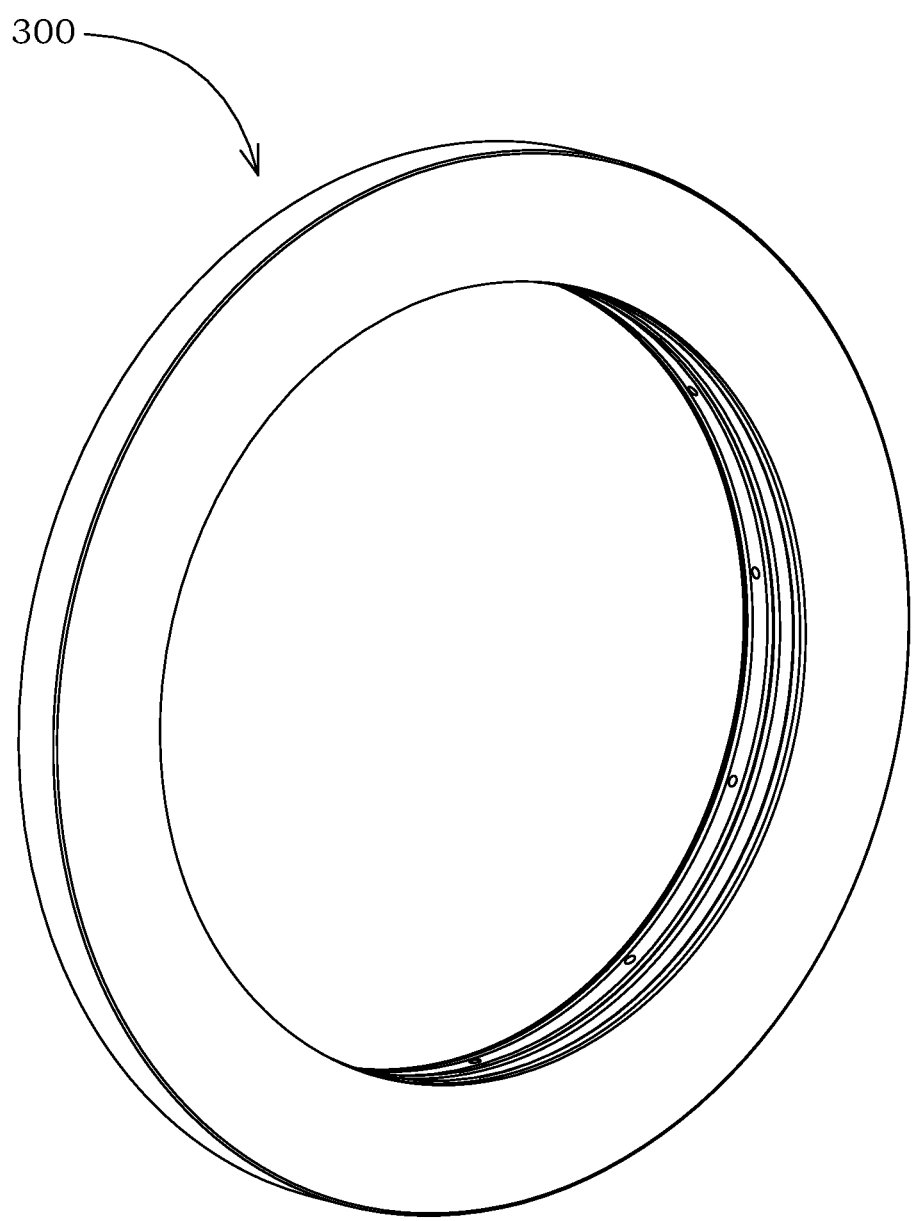
FIG. 18A is a perspective view of another embodiment of a shaft seal assembly.
Figure 18B:
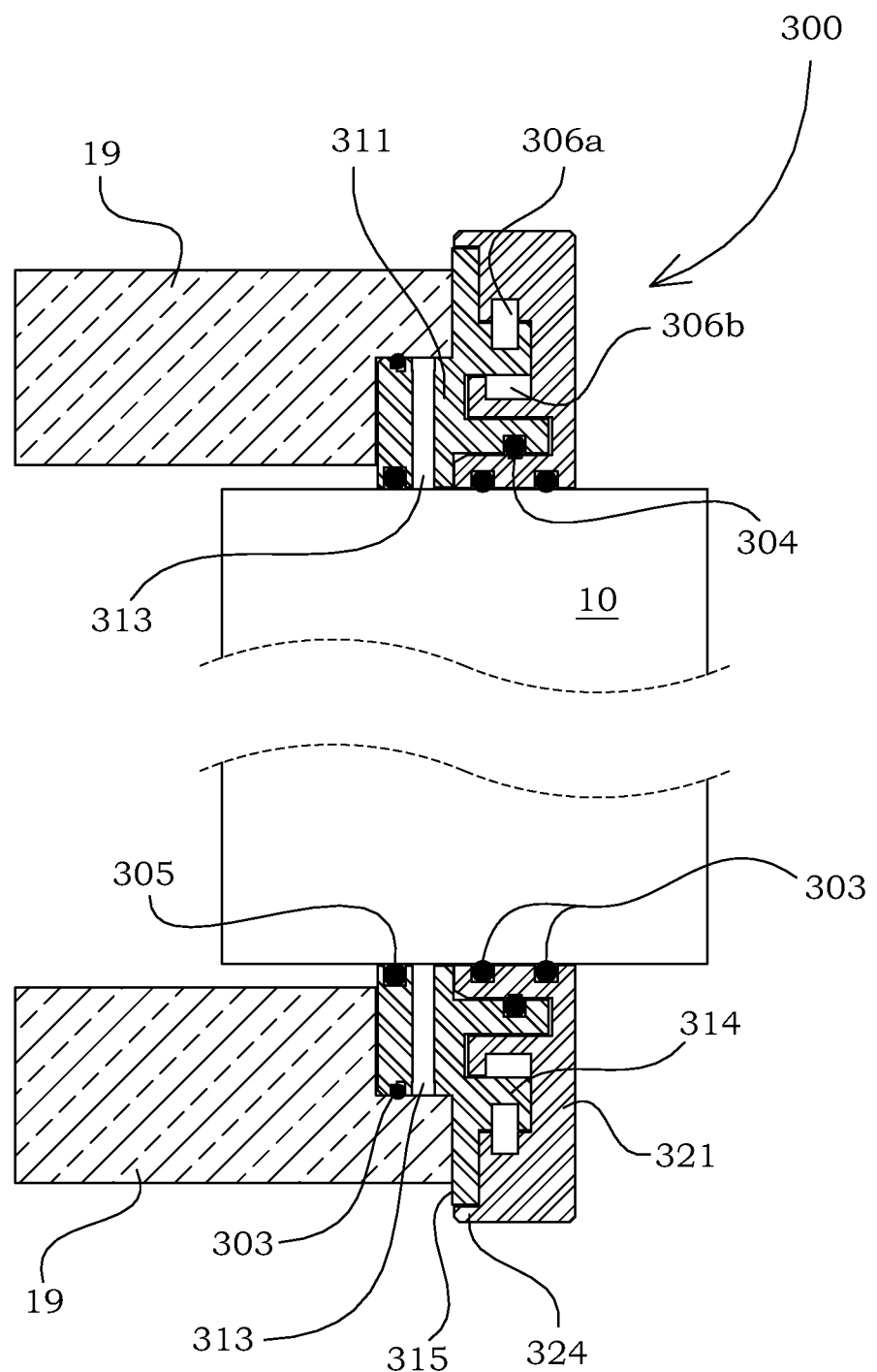
FIG. 18B is an axial, cross-sectional view of the embodiment of a shaft seal assembly shown in FIG. 18A.

Another embodiment of a shaft seal assembly 200 is shown in perspective view in FIG. 18A. The illustrative embodiment shown in FIG. 18A includes both a stator 310 and a rotor 320, which may rotate with respect to one another. The stator 310 may engage a housing 19 and surround a shaft 10 that is rotatable with respect to and extends from the housing 19. In the illustrative embodiment, an o-ring 303 positioned in an o-ring channel 302 formed in the stator 310 may be used to properly engage the stator 310 with the housing 19. However, any other suitable method and/or structure for adequately engaging the stator 310 with the housing 19 may be used with the shaft seal assembly 300 without departing from the spirit and scope as disclosed herein.

The rotor 320 may also surround the shaft 10, and it may also be engaged with the shaft 10 so as to rotate therewith. In the illustrative embodiment, an o-ring 303 positioned in an o-ring channel 302 formed in the rotor 320 may be used to properly engage the rotor 320 with the shaft 10. However, any other suitable method and/or structure for adequately engaging the rotor 320 with the shaft 10 may be used with the shaft seal assembly 300 without departing from the spirit and scope as disclosed herein. It is contemplated that this embodiment may be especially suited for applications in which the shaft 10 and/or housing 19 is oriented in a generally vertical arrangement and extends upward with respect to the housing 19, but the application of the shaft seal assembly 300 in no way limits the scope thereof. Furthermore, any embodiments of a shaft seal assembly 25, 200, 202 may be configured with advantageous features disclosed herein related to the embodiment of a shaft seal assembly 300 shown in FIGS. 18A-18D without limitation alone or in combination.

Figure 18C:
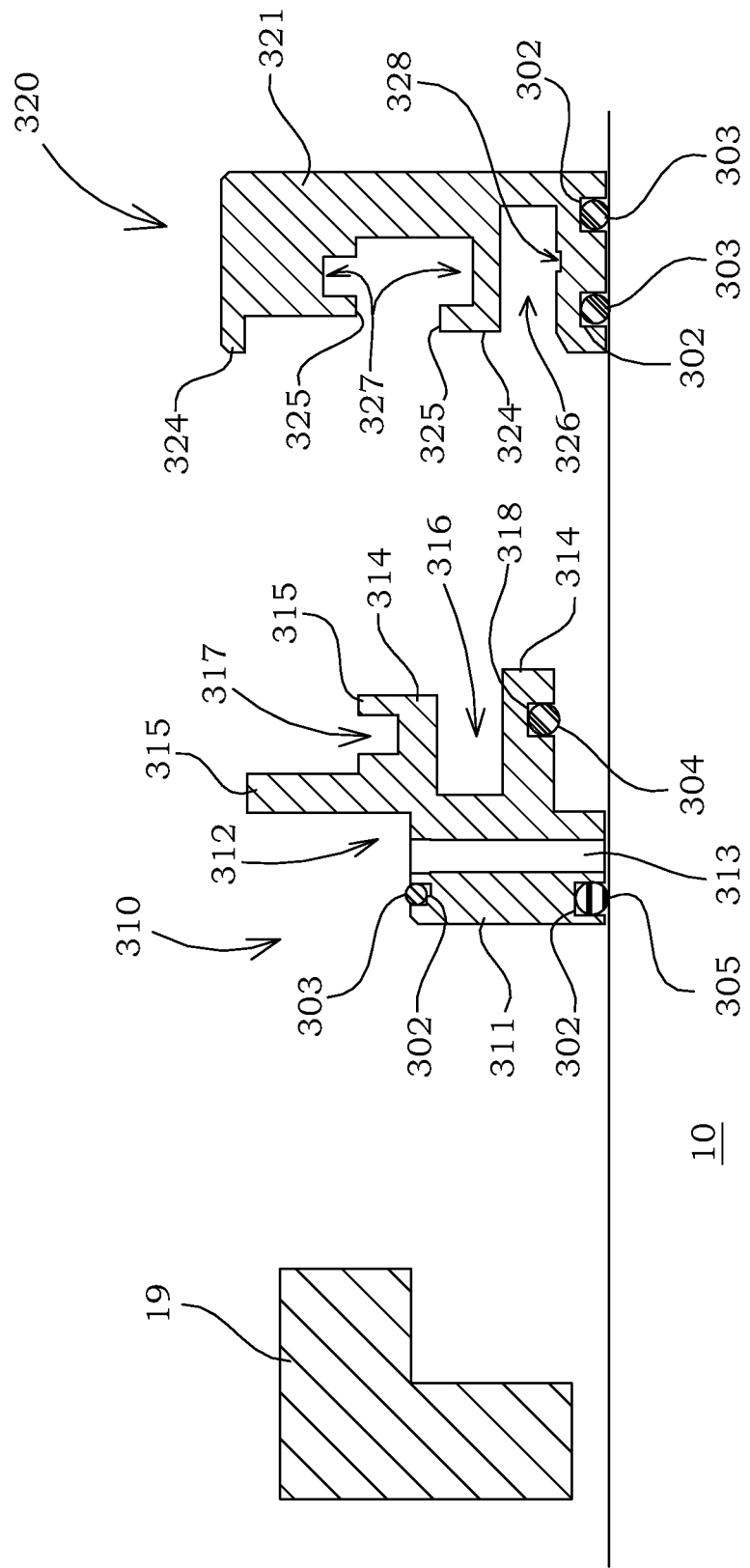
FIG. 18C is an axial, exploded cross-sectional view of the embodiment of a shaft seal assembly shown in FIG. 18A.

The stator 310 may be formed with a stator body 311 having one or more axial projections 314 and/or radial projections 315 extending therefrom. Additionally, an axial projection 314 may extend from a radial projection 315 or vice versa. The embodiment of a shaft seal assembly 300 from FIG. 18A is shown in FIG. 18C with the stator 310 and rotor 320 separated from one another. As shown, a shoulder 312 may be formed in the stator body 311 to provide an interface with a housing 19. An o-ring channel 302 may be formed in the shoulder 312 to accommodate an o-ring 303 to facilitate proper engagement of the stator 310 and housing 19, as previously described above. Another o-ring channel 302 may be formed on the interior surface of the stator body 311 adjacent the shaft 10. A slip ring 305 may be positioned in this o-ring channel 302 to mitigate egress of lubricant from the housing 19 and ingress of contaminants to the housing 19 via the space between the shaft 10 and stator 310. In one embodiment, the slip ring 305 may be constructed of a low-friction synthetic material, such as PTFE. However, the specific materials of construction of the slip ring 305 in no way limit the scope of the present disclosure. The stator body 311 may also be formed with one or more radial bores 313 to facilitate an optional sealing fluid (e.g., air, water, etc.) to further mitigate the egress and/or ingress described above.

The rotor 320 may be formed with a rotor body 321 having one or more rotor axial projections 324 and/or rotor radial projections 325 extending therefrom. Additionally, a rotor axial projection 324 may extend from a rotor radial projection 325 or vice versa. A unitizing ring 304 may reside partially within a unitizing ring channel 318 formed in the stator 310 and partially within a rotor unitizing ring channel 328 and function to allow only a predetermined amount of relative axial motion between the stator 310 and rotor 320. From a comparison of FIGS. 18B and 18C, it will be apparent to those of ordinary skill in the art that the various axial projections 314, radial projections 315, axial channels 316, and/or radial channels 317 formed in the stator 310 may cooperate with various rotor axial projections 324, rotor radial projections 325, rotor axial channels 326, and/or rotor radial channels 327 to create a labyrinth seal having a laborious and/or circuitous path of one or more axial channels 316 and/or one or more radial channels 317 for egress of lubricants from the housing 19 and/or ingress of contaminants to the housing 19. An infinite number of configurations for the various axial projections 314, radial projections 315, axial channels 316, and/or radial channels 317 formed in the stator 310 may cooperate with various rotor axial projections 324, rotor radial projections 325, rotor axial channels 326, and/or rotor radial channels 327 exist, and accordingly, the specific number, existence, and/or configuration thereof in no way limits the scope of the shaft seal assembly 300 as disclosed and claimed herein.

Figure 18D:
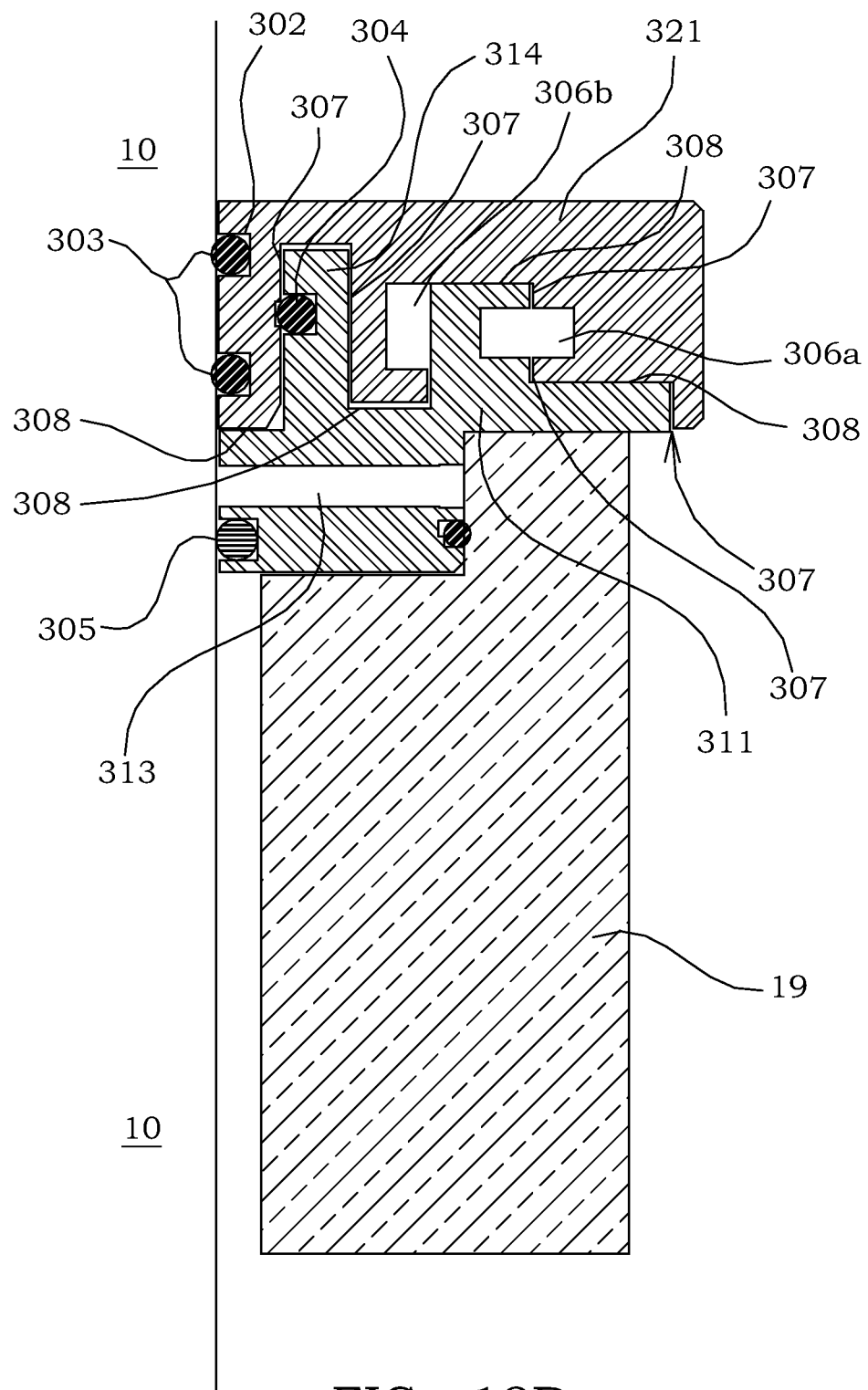
FIG. 18D is a detailed cross-sectional view of the embodiment of a shaft seal assembly shown in FIGS. 18A-18C wherein the shaft is vertically oriented.

In the illustrative embodiment of a shaft seal assembly 300 shown herein, the axial projections 314, radial projections 315, axial channels 316, and/or radial channels 317 formed in the stator 310 may cooperate with various rotor axial projections 324, rotor radial projections 325, rotor axial channels 326, and/or rotor radial channels 327 may be configured to form a first cooperating cavity 306a, a second cooperating cavity 306b, and an axial passage 307 for the first potential ingress point for contaminants. Referring to FIG. 18D, which shows the illustrative embodiment of the shaft seal assembly 300 engaged with a generally vertically oriented shaft 10 protruding upward from a housing 19, the path contaminants must traverse to pass through the illustrative embodiment of the shaft seal assembly 300 is exceedingly tortuous. The only ingress point is a downwardly oriented terminus of an axial passage 307, entry to which requires overcoming gravity. After a radial passage 308, contaminants are faced with another axial passage 307 requiring overcoming gravity once again. This axial passage 307 leads to a first cooperating cavity 306a. Contaminants retained in the first cooperating cavity 306a may simply drain downward therefrom via gravity. An axial passage 307 at the top of the first cooperating cavity 306a requires contaminants to completely fill the first cooperating cavity 306a and then overcome gravity to exit the first cooperating cavity 306a via the top axial passage 307.

A radial passage 308 may fluidly connect the axial passage 307 at the top of the first cooperating cavity 306a to a second cooperating cavity 306b. In the illustrative embodiment, three sides of the second cooperating cavity 306b may be formed via the rotor 320, which generally rotates with the shaft 10 during use. Accordingly, contaminants reaching the second cooperating chamber 306b may be flung radially outward due to centrifugal force imparted to the contaminants via rotation of the rotor 320. If contaminants within the second cooperating chamber 306b drain via gravity through an axial passage 307 at the bottom of the second cooperating chamber 306b, those contaminants must traverse a radial passage 308 prior to encountering a comparatively long radial passage 308 that leads to another axial passage 307 adjacent the distal end of an axial projection 314 formed in the stator 310. Another comparatively long radial passage 308 may be in fluid communication with the axial passage 307 adjacent the distal end of an axial projection 314 formed in the stator 310, the path through which radial passage 308 may be interrupted by a unitizing ring 304 occupying a portion of a unitizing ring channel 318 formed in the stator 310 and a portion of a rotor unitizing ring channel 328. Should contaminants traverse this radial passage 308, those contaminants must also traverse an axial passage 307 in fluid communication with that radial passage 308 before contacting the shaft 10. To enter the housing 19, contaminants positioned on the shaft 19 between the stator 310 and rotor 320 must traverse a slip ring 305 that, in the illustrative embodiment of a shaft seal assembly 300, may be positioned in an o-ring channel 302 in the stator 310 adjacent the shaft 10. In the illustrative embodiment of the shaft seal assembly 300 pictured herein, the various transitions between axial passages 307 and radial passages 308 may be configured as right angles. Additionally, all axial passages 307 may be parallel with one another and perpendicular to all radial passages 308. However, in other embodiments the axial passages 307 and/or radial passages 308 may have different orientations without limitation. For example, in an embodiment not pictured herein, an axial passage 307 may be angled at 45 degrees with respect to the rotational axis of the shaft 10.

The materials used to construct the shaft seal assemblies 25, 200, 202, 300 and various elements thereof will vary depending on the specific application, but it is contemplated that bronze, brass, stainless steel, or other non-sparking metals and/or metallic alloys and/or combinations thereof will be especially useful for some applications. Accordingly, the above-referenced elements may be constructed of any material known to those skilled in the art or later developed, which material is appropriate for the specific application of the shaft seal assembly, without departing from the spirit and scope of the shaft seal assemblies 25, 200, 202, 300 as disclosed and claimed herein.

Having described the preferred embodiments, other features of the shaft seal assemblies 25, 200, 202, 300 will undoubtedly occur to those versed in the art, as will numerous modifications and alterations in the embodiments as illustrated herein, all of which may be achieved without departing from the spirit and scope of the shaft seal assemblies 200, 202, 300 disclosed herein. Accordingly, the methods and embodiments pictured and described herein are for illustrative purposes only.

It should be noted that the shaft seal assemblies 25, 200, 202, 300 are not limited to the specific embodiments pictured and described herein, but are intended to apply to all similar apparatuses and methods for accommodating shaft(s) misalignment with respect to a housing, whether the misalignment is angular, radial, and/or axial. Modifications and alterations from the described embodiments will occur to those skilled in the art without departure from the spirit and scope of the shaft seal assemblies 25, 200, 202, 300.

What is claimed is:

1. A multi-shaft seal assembly comprising:
    a. a first seal configured for engagement with a housing, wherein said first seal is further configured to surround a first shaft protruding from said housing from an area within said housing to an external environment outside of said housing, wherein said first seal is a non-contacting labyrinth seal much that said first seal functions to prevent ingress of contaminants from said external environment to said housing and egress of lubricant from said housing to said external environment adjacent said first shaft via an interface between a first rotating component and a first static component;
    b. a collar configured for engagement with said housing, wherein said collar is positioned adjacent said first seal at a collar cutaway formed in a circumference of said collar, wherein said collar is further configured to surround at least a portion of a second shaft protruding from said housing; and, c. a second seat engaged with said collar, wherein said collar axially spaces said second seal from said housing such that said first and second seals are not axially aligned with one another, wherein said second seal is configured to surround said second shall protruding from said housing from an area within said housing to said external environment outside of said housing, wherein said first seal and said second seal are axially spaced from one another with respect to the rotational axis of said first shaft, wherein said second seal is a non-contacting labyrinth seal such that said second seal functions to prevent ingress of contaminants from said external environment to said housing and egress of lubricant from said housing to said external environment adjacent said second shaft via an interface between a second rotating component and a second static component, wherein said first seal resides in a first plane and said second seal resides in a second plane, and wherein said first and second planes are parallel with respect to one another and spaced from one another in a direction normal to said first and said second planes.

2. The multi-shall seal assembly according to claim 1 wherein said collar is further defined as having an axial dimension substantially equal to that of said first seal.

3. The multi-shaft seal assembly according to claim 2 wherein said second seal further comprises a cutaway on a portion of the periphery of said second seal such that the periphery of said second seal is not circular, and wherein said cutaway is positioned toward said first shaft.

4. The multi-shaft seal assembly according to claim 3 wherein said collar further comprises a collar lip, and wherein said collar lip is configured to engage a peripheral surface of said second seal.

5. The multi-shaft seal assembly according to claim 4 wherein said first seal is further defined as comprising:
   a. a stator engaged with a housing;
   b. a rotor engaged with said first shaft, wherein said rotor rotates with said shaft.

6. The multi-shaft seal assembly according to claim 5 wherein said second seal is further defined as comprising:
   a, a stator engaged with a housing;
   b. a rotor engaged with said first shaft, wherein said rotor rotates with said shaft.

7. The multi-shaft seal assembly according to claim 6 wherein an interface between said stator and said rotor of said first seal is defined as being semi-spherical in shape.

8. The shaft seal assembly according to claim 1 wherein said first rotating component is further defined as a rotor engaged with said first shaft and said first static component is further defined as a stator configured for engagement with said housing.

9. The shaft seat assembly according to claim 1 wherein said second rotating component is further defined as a rotor engaged with said second shaft and said second static component is further defined as a stator configured for engagement with said collar.

10. The shaft seal assembly according to claim 1 wherein said first rotating component is further defined as said first shaft and said first static component is further defined as a portion of said first seal adjacent said first shaft.

11. The shaft seal assembly according to claim 1 wherein said second rotating component is further defined as said second shaft and said second static component is further defined as a portion of said second seal adjacent said second shaft.

12. The multi-shaft seal assembly according to claim 1 wherein said first seal further comprises a cutaway on a portion of the periphery of said first seal such that the periphery of said first seal is not circular, and wherein said cutaway is positioned toward said second shaft.

* * * * *